(12) United States Patent
Tsurumi et al.

(10) Patent No.: US 10,178,081 B2
(45) Date of Patent: Jan. 8, 2019

(54) AUTHENTICATION SYSTEM, METHOD AND STORAGE MEDIUM

(71) Applicants: KABUSHIKI KAISHA TOSHIBA, Minato-ku, Tokyo (JP); TOSHIBA SOLUTIONS CORPORATION, Kawasaki-shi, Kanagawa (JP)

(72) Inventors: Rieko Tsurumi, Saitama (JP); Akio Nishimura, Kanagawa (JP); Tatsuro Ikeda, Tokyo (JP)

(73) Assignees: KABUSHIKI KAISHA TOSHIBA, Tokyo (JP); TOSHIBA SOLUTIONS CORPORATION, Kawasaki-Shi (JP)

( * ) Notice: Subject to any disclaimer, the term of this patent is extended or adjusted under 35 U.S.C. 154(b) by 313 days.

(21) Appl. No.: 15/148,058

(22) Filed: May 6, 2016

(65) Prior Publication Data

US 2016/0248759 A1 Aug. 25, 2016

Related U.S. Application Data

(63) Continuation of application No. PCT/JP2014/079238, filed on Nov. 4, 2014.

(30) Foreign Application Priority Data

Nov. 6, 2013 (JP) .................. 2013-230647

(51) Int. Cl.
*H04L 29/06* (2006.01)
*G06F 21/41* (2013.01)

(52) U.S. Cl.
CPC .......... *H04L 63/0815* (2013.01); *G06F 21/41* (2013.01); *H04L 63/0861* (2013.01); *H04L 63/0884* (2013.01); *H04L 63/102* (2013.01)

(58) Field of Classification Search
CPC ............. H04L 63/0815; H04L 63/0861; H04L 63/0884; H04L 63/102; G06F 21/41
See application file for complete search history.

(56) References Cited

U.S. PATENT DOCUMENTS

2003/0149781 A1* 8/2003 Yared ...................... G06F 21/41
709/229
2004/0230831 A1* 11/2004 Spelman ................. G06F 21/33
726/8

(Continued)

FOREIGN PATENT DOCUMENTS

JP 2001-197055 7/2001
JP 2001-273421 10/2001

(Continued)

OTHER PUBLICATIONS

Kim et al., Implementation for federated Single Sign-on based on network identity, May 2010, International Conference on Networked Computing, pp. 1-3 (Year: 2010).*

(Continued)

*Primary Examiner* — Kenneth W Chang
(74) *Attorney, Agent, or Firm* — Amin, Turocy & Watson LLP

(57) ABSTRACT

An authentication system according to an embodiment is provided with a service providing apparatus, an IDaaS corporation apparatus, and an authentication providing apparatus. Based on the user ID and SSO request transmitted from the user terminal, the authentication providing apparatus executes authentication processing for the user. If the result of the authentication processing indicates success, the IDaaS corporation apparatus having SSO account information including the SSO account identifier identical to the user ID, permits SSO authentication to be executed for the service identified by the service account identifier included in the service account information associated with the SSO (Continued)

account information. The service providing apparatus transmits information related to the service to the user terminal.

8 Claims, 20 Drawing Sheets

(56) References Cited

U.S. PATENT DOCUMENTS

| | | | | |
|---|---|---|---|---|
| 2008/0168539 A1* | 7/2008 | Stein | ............... | G06F 21/335 |
| | | | | 726/5 |
| 2009/0089625 A1* | 4/2009 | Kannappan | ............ | G06Q 10/10 |
| | | | | 714/39 |
| 2009/0119763 A1* | 5/2009 | Park | ............... | H04L 63/0815 |
| | | | | 726/8 |
| 2009/0125972 A1* | 5/2009 | Hinton | ............... | H04L 63/126 |
| | | | | 726/1 |
| 2009/0292814 A1* | 11/2009 | Ting | ............... | G06F 15/16 |
| | | | | 709/229 |
| 2011/0209202 A1 | 8/2011 | Otranen | | |
| 2013/0219461 A1 | 8/2013 | Esaki et al. | | |

FOREIGN PATENT DOCUMENTS

| | | |
|---|---|---|
| JP | 2007-257426 | 10/2007 |
| JP | 4956096 | 6/2012 |
| JP | 2013-171349 | 9/2013 |

OTHER PUBLICATIONS

International Search Report for International Patent Application No. PCT/JP2014/079238 dated Feb. 3, 2015, 4 pages.
Written Opinion for International Patent Application No. PCT/JP2014/079238 dated Feb. 3, 2015, 3 pages.
International Preliminary Report on Patentability for International Patent Application No. PCT/JP2014/079238 dated May 19, 2016.

* cited by examiner

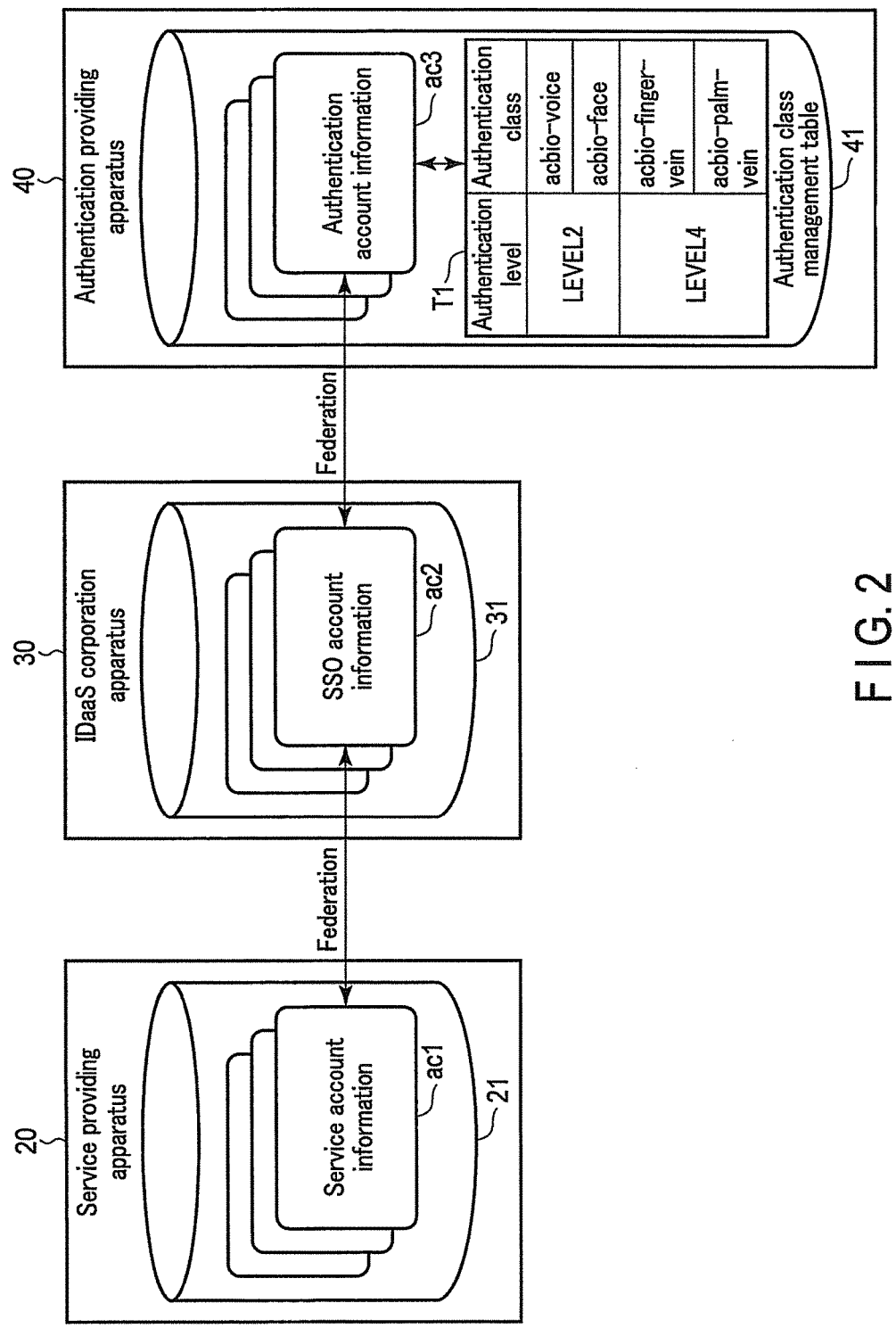
F I G. 2

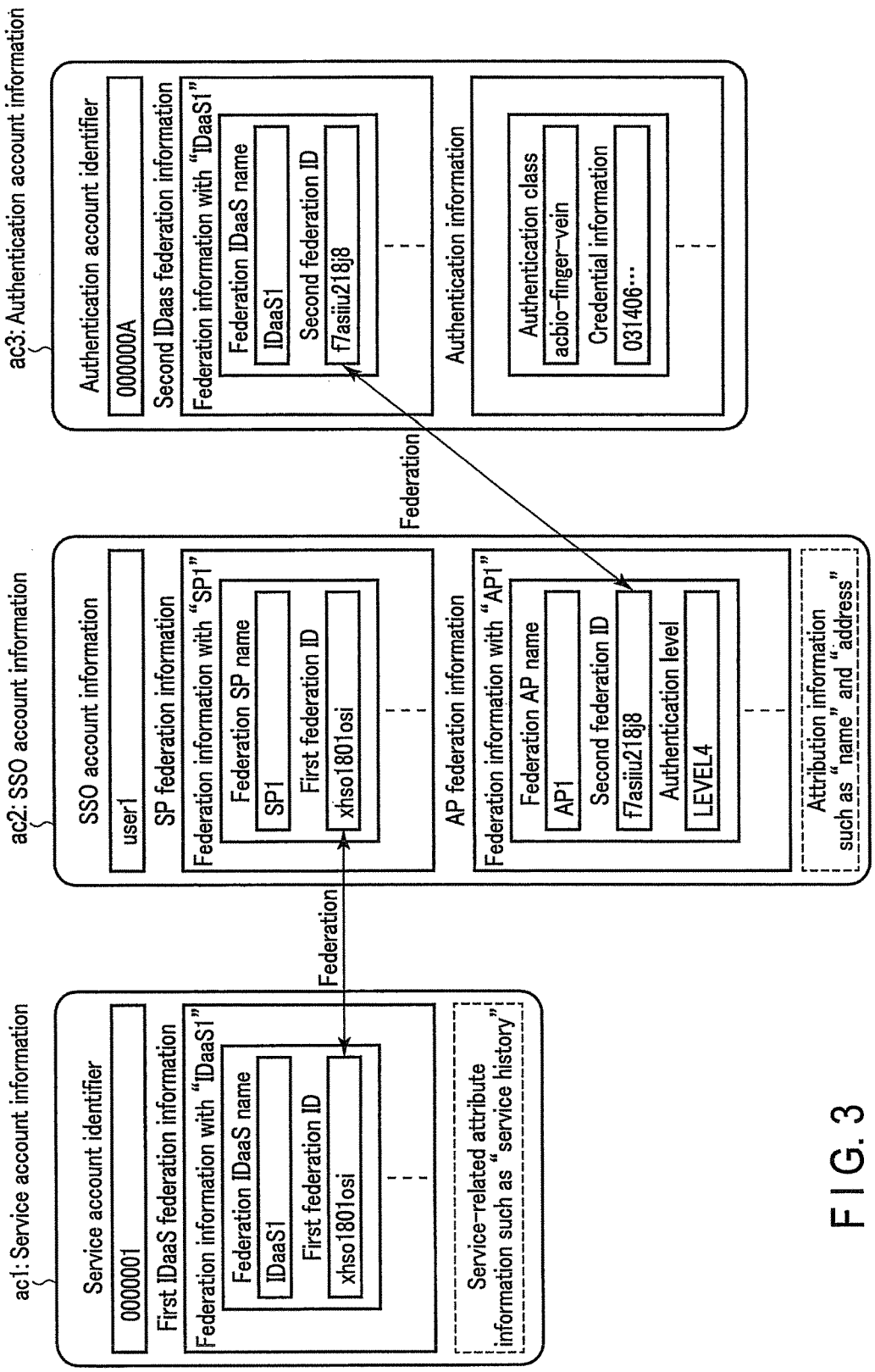
F I G. 3

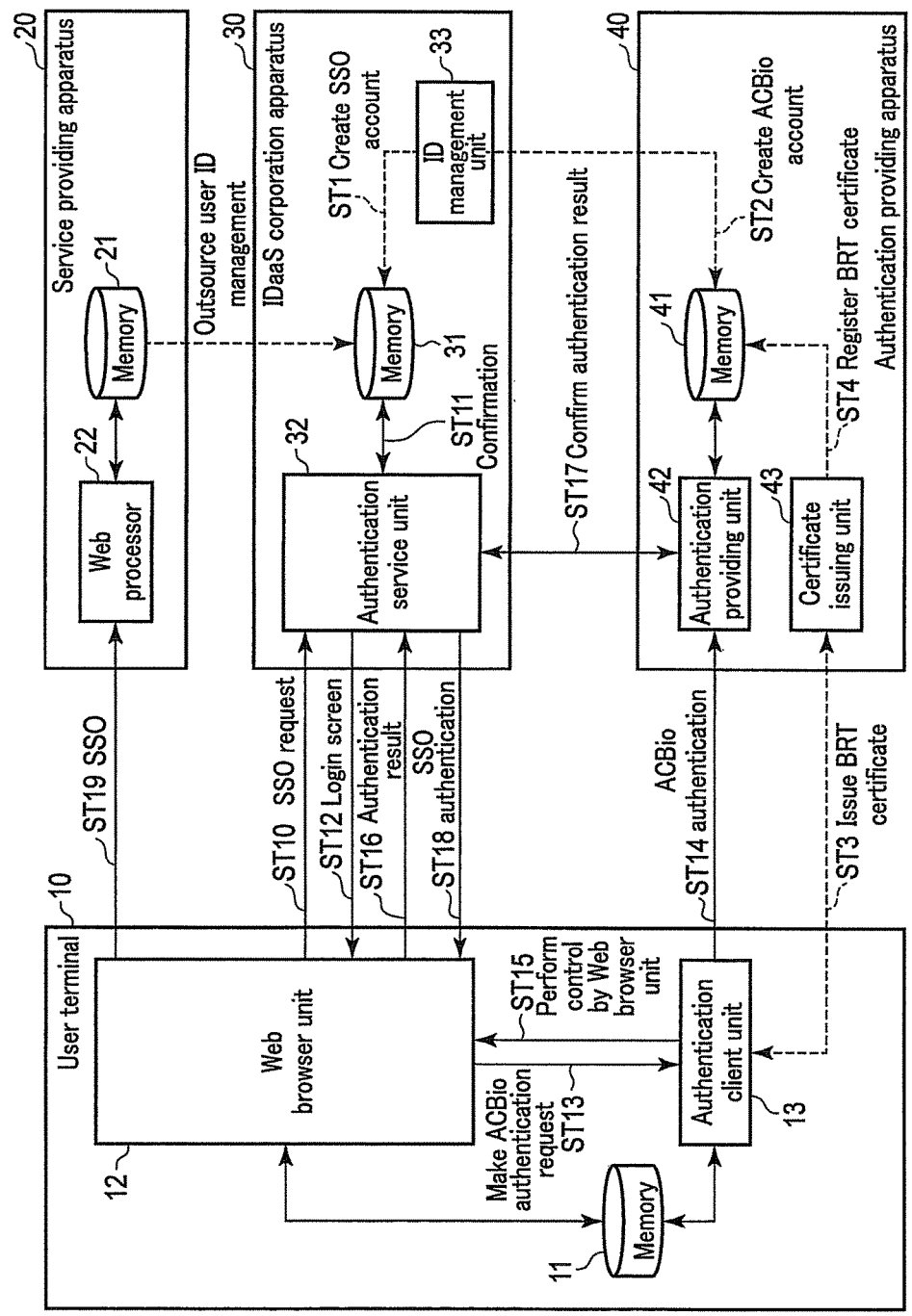
F I G. 4

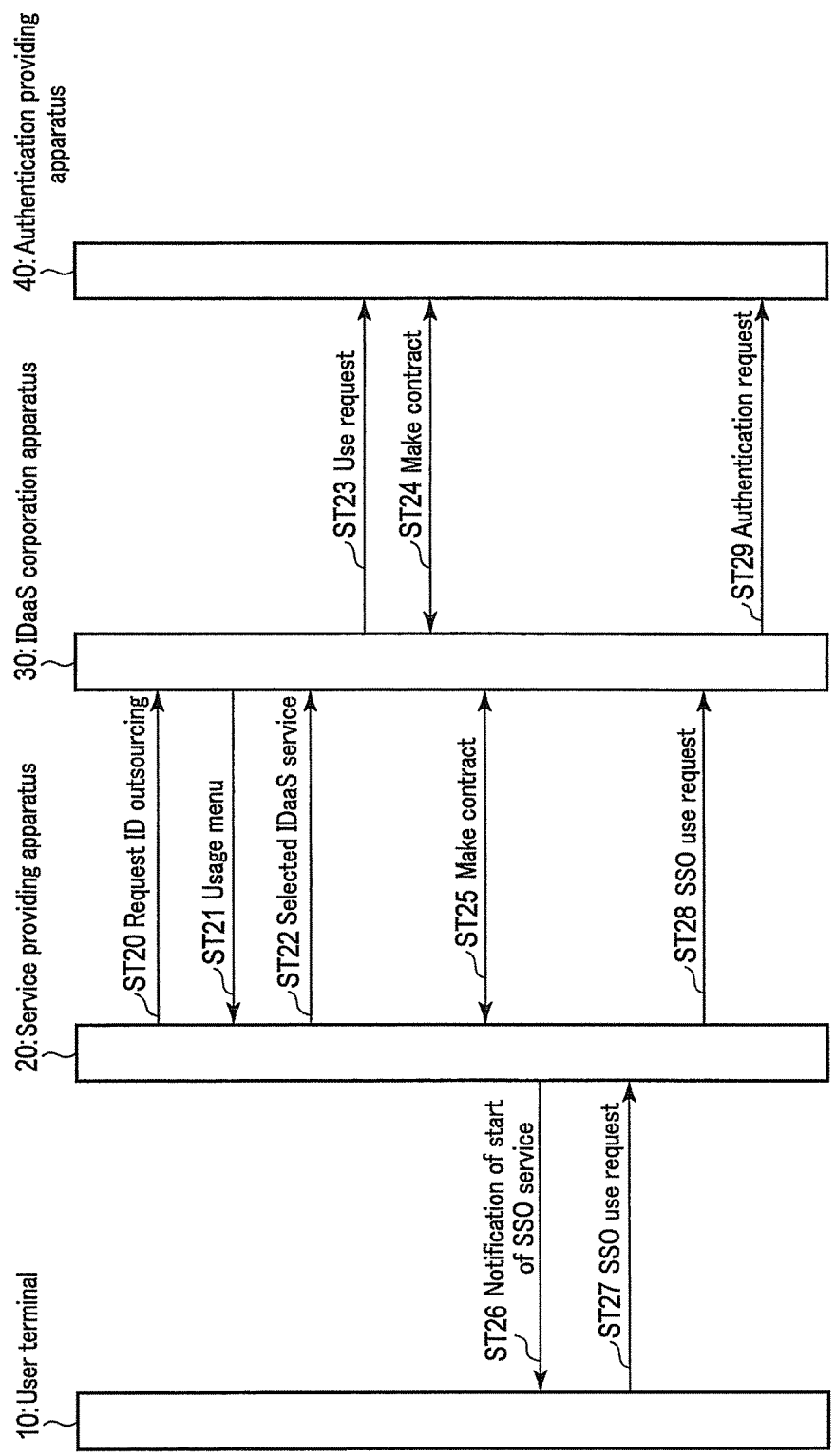
F I G. 5

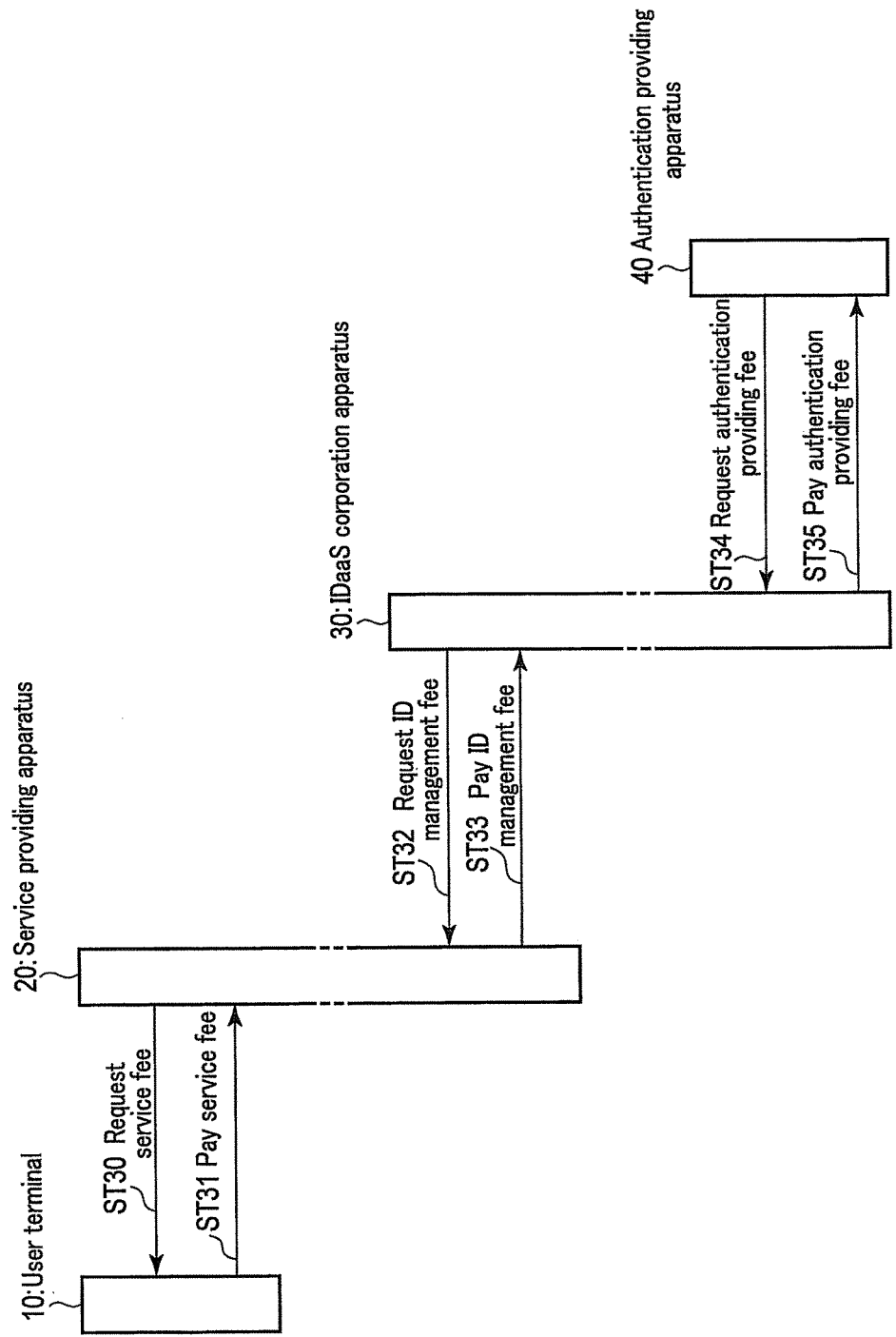
F I G. 6

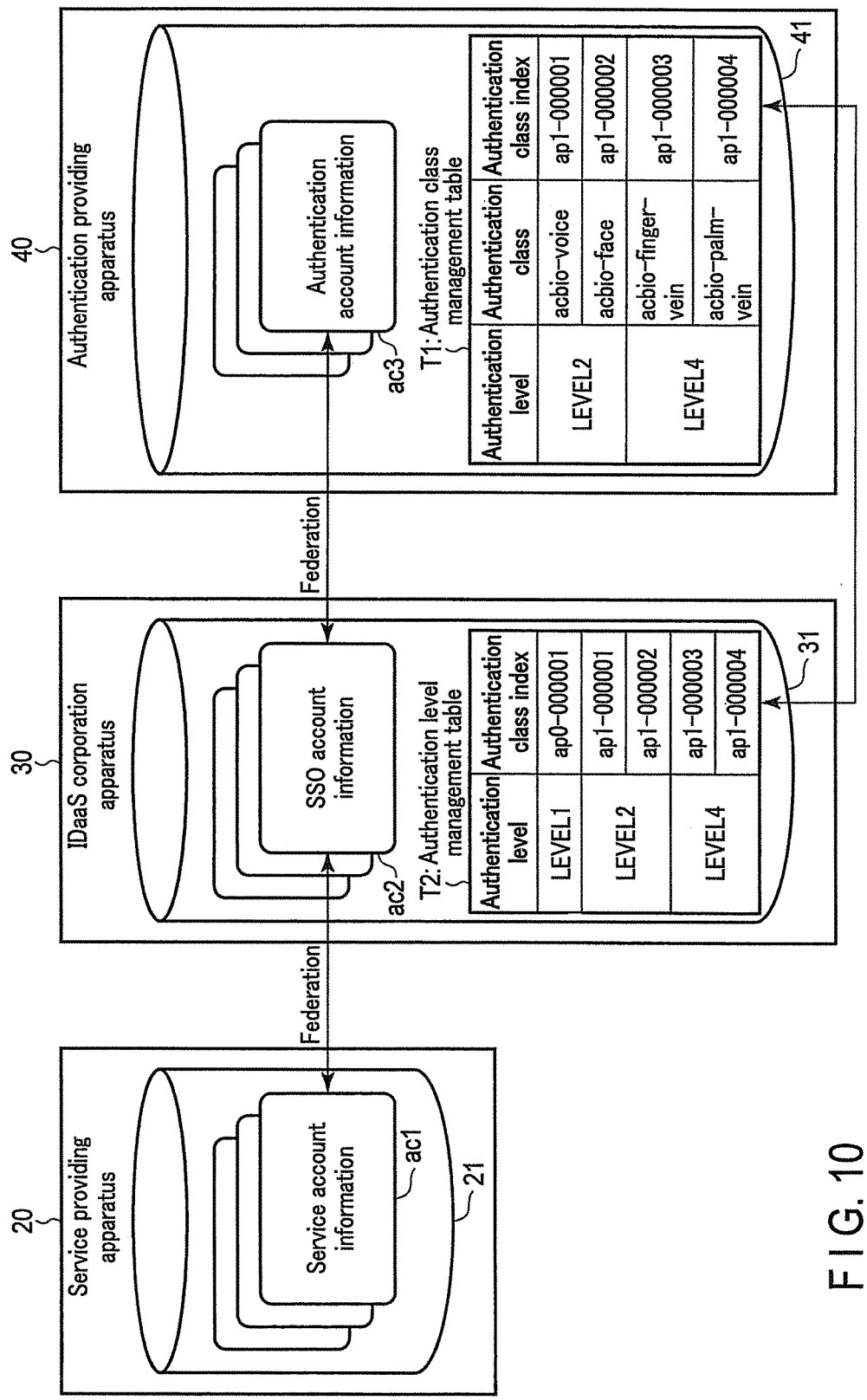
F I G. 10

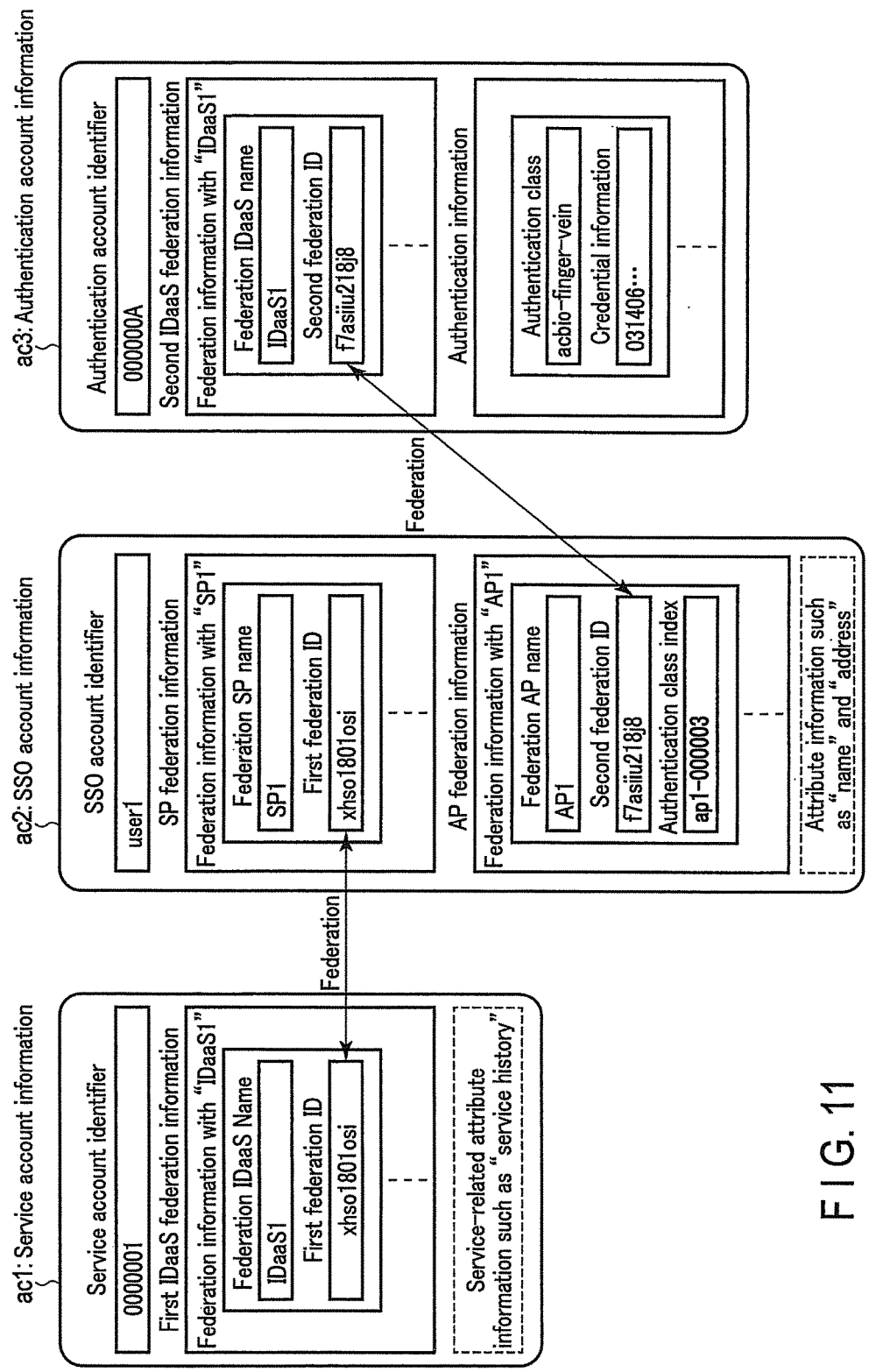
F I G. 11

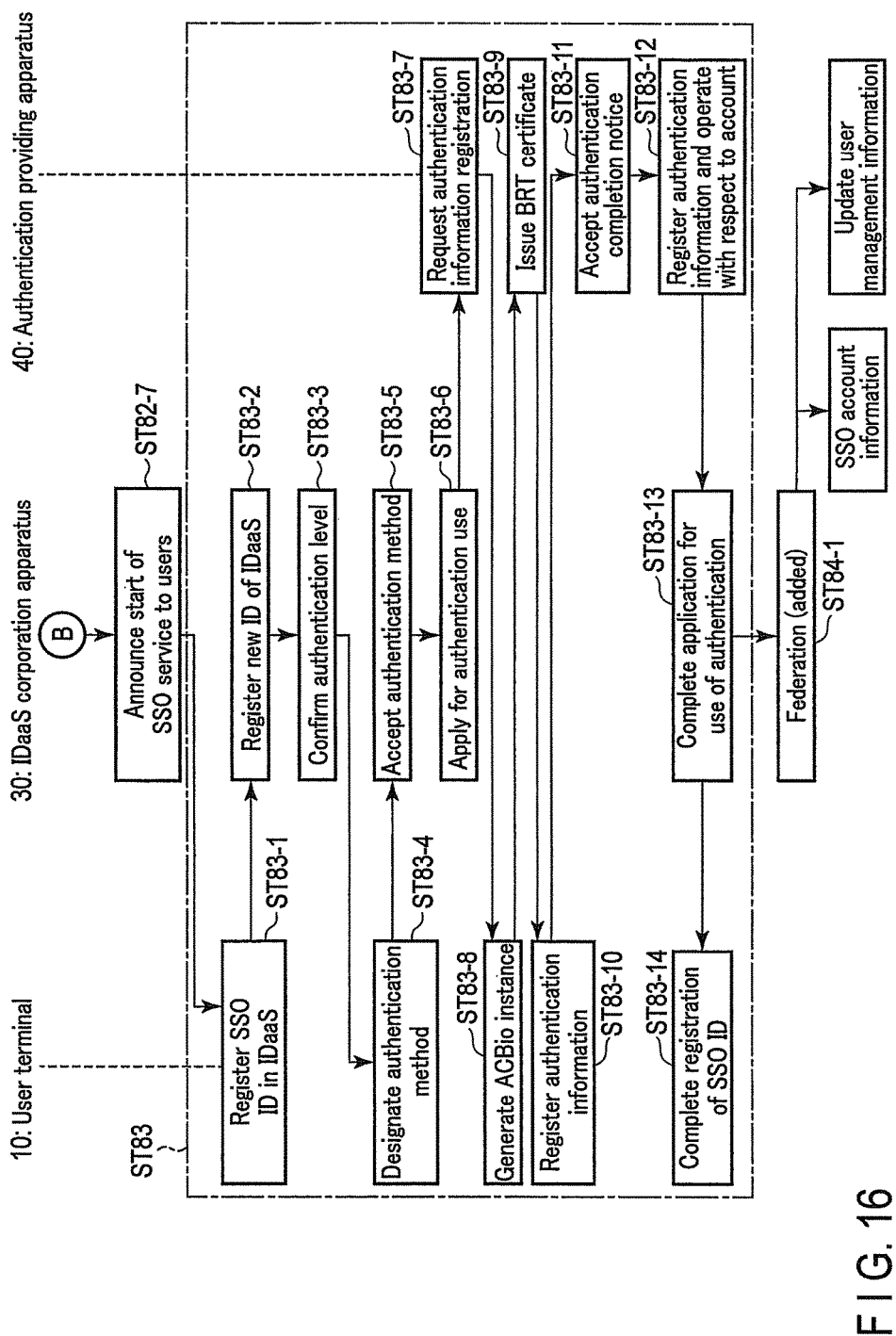
F I G. 16 p1 — Example of case where authentication level change notice is issued
(Policy)
- Information disclosure to user is of primary importance
- Disclose accurate information promptly
- Enable smooth operation without preventing user's use (Operation Example)
- Post state report on web site
- Notify user that authentication level is lowered
- Notify user of alternative measures that can be taken when authentication level is low
- Notify user of restoration of authentication level and action that can be taken in response
(e.g., automatic switching from alternative means)
- Set up help desk for inquiry processing In the above case, operations are performed based on policy in predetermined way

FIG. 20 p2 — Example of case where authentication level restoration notice is issued
(Policy)
- Information disclosure to user is of primary importance
- Disclose accurate information promptly
- Enable smooth operation without preventing user's use (Operation Example)
- Post restoration report and apology on web site
- Report cause of problem
- Notify user that authentication level is restored
- When authentication level is restored, switch automatically from alternative means
- Close help desk In the above case, operations are performed based on policy in predetermined way

FIG. 21

AUTHENTICATION SYSTEM, METHOD AND STORAGE MEDIUM

CROSS-REFERENCE TO RELATED APPLICATIONS

This application is a Continuation Application of PCT application No. PCT/JP2014/079238, filed on Nov. 4, 2014, and is based upon and claims the benefit of priority from Japanese Patent Application No. 2013-230647, filed on Nov. 6, 2013; the entire contents of which are incorporated herein by reference.

FIELD

Embodiments described herein relate generally to an authentication system, method and storage medium.

BACKGROUND

In recent years, a service provider, such as an enterprise or a service providing corporation, authenticates the ID and password of a user and provides the user with a service.

Therefore, the user has to manage the ID and password for each of the services. In order to tighten the security, each service provider requires that the user change the password regularly or use a long complicated password.

When a financial institution is used online, the use of a random card or a one-time password is recommended for proof of identity. In this case, the user has to manage a one-time password device and a random number table for each of the services.

On the other hand, the service provider has to manage and authenticate the ID and password for each user, and provides a service to that user. The service provider maintains high security for each user by utilizing the one-time password device and the random number table, because the utilization of these helps reduce the cost and provide an easy operation. The one-time password device and random number table of one service provider are not shared with another service provider to ensure the high security.

As described above, the user and the service provider have to manage the password, the one-time password device and random number table. This kind of management may be complicated and degrade the convenience since the number of items to be managed increases in accordance with an increase in the number of combinations of users and services. In order to solve this problem, authentication federation based on single sign-on (SSO) has come to be used, which enables the user to use a number of services by a single authentication operation.

In order to use the single sign-on, a plurality of service providers have to build a relationship of trust and authentication federation has to be performed among the systems of the service providers.

However, the authentication federation described above requires that each service provider manage the system of another service provider. Accordingly, the operation may become complicated, degrading the convenience of the service providers.

Furthermore, if the systems are based on different authentication levels, the authentication federation described above does not ensure safe use of single sign-on, and the convenience of the user is degraded thereby.

In addition, the service provider cannot easily provide a highly secure environment such as biometric authentication, and there is a possibility that the service provider will continue to use the environment it has built. As a result, the authentication method provided to the user may be fixed.

Meantime, an IDaas (Identity as a Service) corporation is known as a corporation which undertakes the job of managing users' IDs for service providers.

Accordingly, the embodiments are intended to provide an authentication system, method and, storage medium that enable an authentication method to be easily changed while simultaneously maintaining the convenience of the users and service providers.

BRIEF DESCRIPTION OF DRAWINGS

FIG. 2 is a schematic diagram illustrating account information etc. of each apparatus of the embodiment.

FIG. 3 is a schematic diagram illustrating each account information of the embodiment.

FIG. 4 is a schematic diagram illustrating an example of an operation in the embodiment.

FIG. 5 is a sequence diagram illustrating an example of a business sequence in the embodiment.

FIG. 6 is a sequence diagram illustrating an example of a business sequence in the embodiment.

FIG. 10 is a schematic diagram illustrating each management table applicable to an authentication system according to the second embodiment.

FIG. 11 is a schematic diagram illustrating each account information of the embodiment.

FIG. 16 is a flowchart illustrating an example of an operation in the embodiment.

FIG. 20 is a schematic diagram illustrating an example of a policy based on which the authentication level is changed in the embodiment.

FIG. 21 is a schematic diagram illustrating an example of a policy based on which the authentication level is changed in the embodiment.

DETAILED DESCRIPTION

Figure 1:
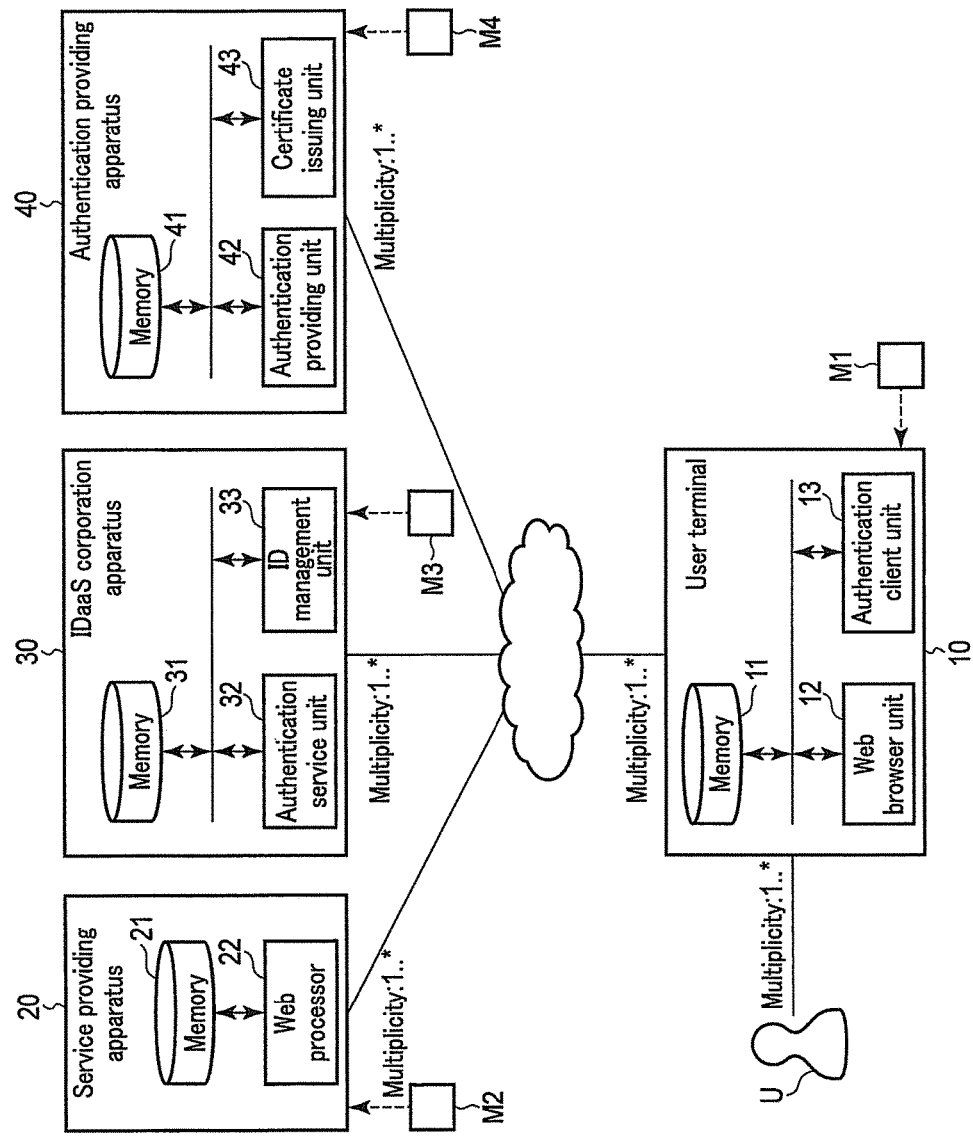
FIG. 1 is a schematic diagram illustrating the configuration of an authentication system according to the first embodiment.

Prior to the descriptions of the embodiments, a summary of each embodiment will be given.

The first embodiment relates to an authentication system provided with: a service providing apparatus capable of communicating with a user terminal operated by a user; an IDaaS corporation apparatus, and an authentication providing apparatus. The authentication system may include an IDaaS corporation apparatus and an authentication providing apparatus capable of respectively communicating with a user terminal operated by a user and a service providing apparatus for providing the user with a service.

The service providing apparatus comprises a service account information memory. The service account information memory stores service account information including: (i) service account identifiers for identifying the accounts of the service provided by the service providing apparatus and (ii) a first federation ID.

The IDaas corporation apparatus includes a single sign-on (SSO) account information memory. The SSO account information memory stores single sign-on (SSO) account information including (i) a single sign-on (SSO) account identifier which is identical to the user ID for identifying a user, a first federation ID which is identical to the first federation ID, and a second federation ID different from the first federation ID.

The authentication providing apparatus is provided with an authentication account information memory. The authentication account information memory stores authentication account information including: an authentication account identifier for identifying an account of the authentication processing corresponding to the user; a second federation ID which is identical to the second federation ID described above; and an authentication class indicative of the method of the authentication processing.

Based on the user ID and SSO request transmitted from the user terminal, the authentication providing apparatus having authentication account information which is associated, by the second federation ID, with the SSO account information including the SSO account identifier identical to the user ID, executes authentication processing for the user who operates the user terminal.

If the result of the authentication processing indicates success, the IDaaS corporation apparatus having SSO account information including the SSO account identifier identical to the user ID of the user subjected to the authentication processing, permits SSO authentication to be executed for the service identified by the service account identifier included in the service account information associated with the SSO account information by the first federation ID.

The service providing apparatus which provides the service for which the SSO authentication is permitted, transmits information related to the service to the user terminal which transmitted the user ID and the SSO request.

According to the first embodiment mentioned above, each service provider does not have to monitor the system of another service provider. Since the operation is made easy thereby, the convenience of the service provider is enhanced.

Furthermore, in the authentication federation described above, the authentication providing apparatus associated with the IDaaS corporation apparatus executes authentication. Therefore, the user can use single sign-on in safety, and the convenience of the user can be enhanced.

In addition, the service provider does not have to provide a highly secure environment such as biometric authentication, and the service provider can easily change the authentication method provided to the user.

According to the first embodiment, the authentication method can be easily changed, with the convenience of the user and the service provider being enhanced.

The authentication providing apparatus of the first embodiment is provided with a first table memory storing an authentication class management table, and an authentication class representing the authentication method and an authentication level representing the level of the authentication processing are described in the authentication class management table in association with each other.

The SSO account information memory includes an authentication level.

If something is wrong with the authentication processing, and the level of that authentication deteriorates, the authentication providing apparatus updates the authentication class management table in such a manner as to lower the authentication level of the authentication processing, and transmits to the IDaaS corporation apparatus the lowered authentication level and the authentication class associated therewith in the authentication account information.

Upon receipt of the authentication level and authentication class from the authentication providing apparatus, the IDaaS corporation apparatus searches the SSO account information based on the received authentication class, and updates the SSO account information such that the authentication level searched for is lowered to the received authentication level.

Therefore, if something is wrong with the authentication processing, and the level of that authentication deteriorates, the first embodiment lowers the authentication level, and the reliability of the authentication processing can be maintained.

According to the second embodiment, an authentication providing apparatus is provided with a first table memory. The first table memory stores an authentication class management table in which an authentication class representing the authentication method, an authentication level representing the level of the authentication processing and an authentication class index including the name of the authentication provider of the authentication class are described in association with one another.

The IDaaS corporation apparatus is provided with a second table memory storing an authentication level management table in which an authentication level and an authentication class index are described in association with each other.

If something is wrong with the authentication processing, and the level of that authentication deteriorates, the authentication providing apparatus updates the authentication class management table in such a manner as to lower the authentication level of the authentication processing, and transmits to the IDaaS corporation apparatus the authentication level lowered in the authentication class management table and the authentication class index associated therewith.

Upon receipt of the authentication level and authentication class index from the authentication providing apparatus, the IDaaS corporation apparatus searches the authentication level management table based on the received authentication class index. The IDaaS corporation apparatus updates the authentication level management table in such a manner as to lower the authentication level searched for to the received authentication level.

Therefore, if something is wrong with the authentication processing, and the level of that authentication deteriorates, the second embodiment lowers the authentication level, and the reliability of the authentication processing can be maintained. When the authentication level is lowered, the IDaaS corporation apparatus of the second embodiment does not have to update the SSO account information of each user ID. Since the IDaas corporation apparatus is only required to update the authentication level management table, the load required for lowering the authentication level can be significantly reduced.

The above is a summary of each embodiment. Subsequently, a specific description of each embodiment will be given.

<First Embodiment>

FIG. 1 is a schematic diagram illustrating the configuration of an authentication system according to the first embodiment, and FIGS. 2 and 3 are schematic diagrams illustrating account information etc. of each apparatus of the embodiment.

The authentication system is provided with a user terminal 10 operated by user U, a service providing apparatus 20, an IDaaS corporation apparatus 30, and an authentication providing apparatus 40. In actuality, there are many users U, many user terminals 10, many service providing apparatuses 20, many IDaaS corporation apparatuses 30, and many authentication providing apparatuses 40, but only one of each of these is illustrated in the drawings. Each of apparatuses 10, 20, 30 and 40 may be implemented as either hardware circuitry or a combination of hardware circuitry and software. As the software combined with the hardware circuitry, a program is used, which is pre-installed in a computer from a network or non-transitory computer-readable storage mediums M1, M2, M3 and M4 and is executed by the processor of the computer to attain each of the functions of the apparatuses 10, 20, 30 and 40.

The user U is an individual user or a corporate user who enjoys the service. What is shown in FIGS. 1-3 is premised on the condition that a service is provided in response to login authentication. The user U includes an individual person, a person belonging to a private sector, a person belonging to a public sector, etc.

The user terminal 10 is a terminal apparatus that has an ordinary computer function and that can access to other apparatuses 20, 30 and 40 using a web browser. The user terminal 10 may be any type of terminal apparatus, such as a notebook PC (personal computer), a desktop PC or a mobile terminal.

The user terminal 10 described herein is provided with a memory 11, a web browser unit 12 and an authentication client unit 13. The web browser unit 12 is a function unit realized when a processor (not shown) of the user terminal 10 executes a browser application program stored in the memory 11. Likewise, the authentication client unit 13 is a function unit realized when the processor (not shown) of the user terminal 10 executes a authentication application program stored in the memory 11. The "web browser unit 12" and "authentication client unit 13" may be implemented as "web browser circuitry 12" and "authentication client circuitry 13", respectively.

The service providing apparatus 20 is an apparatus run by the service provider and includes a public service site and a private service site. The service providing apparatus 20 is a general type of web service provider that provides a service in response to a request made by the user terminal 10.

The service providing apparatus 20 described herein includes, for example, a memory 21 and a secure web processor 22. The web processor 22 is a function unit realized when the processor (not shown) of the user terminal 20 executes a secure-processing application program stored in the memory 21. As shown in FIGS. 2 and 3, the memory 21 is a storage device for storing service account information ac1, etc. The "web processor 22" may be implemented as "web processing circuitry 22".

As shown in FIG. 3, the service account information ac1 includes a service account identifier and first IDaaS federation information. The service account information may further include service-related attribute information, such as service history.

The service account identifier is an identifier that identifies an account for which the service provider provides a service of each user.

The first IDaaS federation information includes a federation IDaaS name representing a federation IDaaS corporation, and first federation ID which is identification information shared by both the service providing apparatus 20 and an IDaaS corporation apparatus 30 for federation.

To the user U, the administrator of the user ID is the service provider. In practice, the service provider outsources the management of the user ID to the IDaaS corporation. For this reason, the real data of the user ID is in a region administered by the IDaaS corporation.

The IDaaS corporation apparatus 30 is run by the IDaaS corporation, which undertakes the job of managing user IDs for service providers. The "IDaaS corporation" may be referred to as an "ID provider."

As shown in FIG. 1, the IDaaS corporation apparatus 30 described herein is provided with a memory 31, an authentication service unit 32 and an ID management unit 33. The authentication service unit 32 is a function unit realized when a processor (not shown) of the IDaaS corporation apparatus 30 executes an authentication-service application program stored in the memory 31. The ID management unit 33 is a function unit realized when the processor (not shown) of the IDaaS corporation apparatus 30 executes an authentication-service application program stored in the memory 31. As shown in FIGS. 2 and 3, the ID management unit 33 creates SSO account information ac2, for association with IDs. The ID management unit 33 may determine an authentication method based on the SSO account information ac2. The memory 31 is a storage device for storing SSO (Single Sign-On) information ac2, etc. The "authentication service unit 32" and "ID management unit 33" may be implemented as "authentication service circuitry 32" and the "ID management circuitry 33", respectively.

As shown in FIG. 3, the SSO account information ac2 includes an SSO account identifier, SP federation information and AP federation information. The SSO account information ac2 may further include user management information, which is the value of the SSO account identifier associated with a user ID. As the user management information, the name, address, age, mail address, telephone number, password etc. of user U can be used. The abbreviation "SP" stands for "Service Provider", and the abbreviation "AP" stands for "Authentication Provider."

The SSO account identifier is an identifier that identifies the single sign-on account of each user of the IDaaS corporation, and an user ID is used as the value of the SSO account identifier.

The SP federation information includes a federation SP name representing a federation service provider, and a first federation ID which is identification information shared with the service provider apparatus 20 for federation.

The AP federation information includes a federation AP name representing a federation authentication provider, a second federation ID which is identification information shared with the authentication apparatus 40 for federation, and an authentication level representing the level of the authentication processing performed by the authentication provider 40.

The authentication providing apparatus 40 is run by the authentication provider, which undertakes the job of authentication for the IDaaS corporation. For example, the ACBio (Authentication Context for Biometrics) technology defined in ISO/IEC 24761 enables authentication providing service, which identifies a person without the information on the biometric authentication of that person being transmitted on a network.

As shown in FIG. 1, the authentication providing apparatus 40 described herein is provided with a memory 41, an authentication providing unit 42 and an certificate issuing unit 43. The authentication providing unit 42 is a function unit realized when a processor (not shown) of the authentication providing apparatus 40 executes an authentication-providing application program stored in the memory 41. The authentication providing unit 42 provides ACBio authentication. The certificate issuing unit 43 is a function unit realized when the processor (not shown) of the authentication providing apparatus 40 executes a certificate-issuing application program stored in the memory 41. The certificate issuing unit 43 issues a Biometric Reference Template (BRT) Certificate beforehand, which is checked at the time of the verification by the authentication providing unit 42. The BRT certificate is a certificate transmitted along with the client's biometric authentication results used in the ACBio authentication. As shown in FIGS. 2 and 3, the memory 41 is a storage device for storing authentication account information ac3 and authentication class management table T1. The "authentication providing unit 42" and "certificate issuing unit 43" may be implemented as "authentication providing circuitry 42" and "certificate issuing circuitry 43", respectively.

As shown in FIG. 3, the authentication account information ac3 includes an authentication account identifier, second IDaaS federation information and authentication information.

The authentication account identifier is an identifier that identifies an account for which the authentication provider performs authentication for each user.

The second IDaaS federation information includes a federation IDaaS name representing a federation IDaaS corporation, and an second federation ID which is identification information shared by both the authentication providing apparatus 40 and the IDaaS corporation apparatus 30 for federation.

The authentication information includes an authentication class for identifying the information which the authentication providing apparatus 40 requires for performing authentication processing, and each user's credential information used in the authentication processing.

The authentication class is information common to users and identifies information required for execution of authentication processing. The authentication class includes, for example, an authentication processing method. For example, the "acbio-finger-vein" shown in FIG. 3 indicates that the authentication processing method is the finger-vein authentication of the ACBio technology.

The credential information is information required for executing authentication processing for each user. In the case of the ACBio technology, the credential information includes a BRT certificate or information for identifying the BRT certificate. The BRT certificate is data on the hash value of the biometric reference template and is digitally signed by an issuer (such as an IDaas corporation or a third-party organization). The biometric reference template is credential information and used as the authenticity criterion of the user's biometric authentication.

In the authentication class management table T1, the authentication level representing the level of the authentication processing performed by the authentication providing apparatus 40 and the authentication class identifying the information which the authentication providing apparatus 40 requires for executing the authentication processing, are described in association with each other.

An operation of the authentication system having the above configurations will now be described with reference to FIGS. 4 through 9.

As preliminary preparations, steps ST1 to ST4 are performed to store account information ac1 to ac3, as shown in FIG. 4. Steps ST2 to ST4 indicate ACBio authentication processing, which is an example of authentication processing. Steps ST2 to ST4 are modified if another kind of authentication processing is performed.

In step ST1, the ID management unit 33 of the IDaaS corporation apparatus 30 creates SSO account information ac2 and stores this SSO account information ac2 in the memory 31. The ID management unit 33 associates the SSO account information with a user ID. Likewise, the ID management unit 33 creates service account information ac1 and stores this SSO account information ac1 in the memory 21.

In step ST2, the ID management unit 33 creates authentication account information ac3 and stores this authentication account information ac3 in the memory 41. The authentication account information ac3 is associated with the SSO account information ac2.

In step ST3, the authentication client unit 13 of the user terminal 10 and the certificate issuing unit 43 of the authentication providing apparatus 40 issue a BRT certificate.

In step ST4, the BRT certificate issued by the certificate issuing unit 43 is registered in the authentication account information ac3.

After these preliminary preparations, single sign-on (SSO) authentication is enabled, as shown in steps ST10 to ST19.

In step ST10, the web browser unit 12 of the user terminal 10 transmits a user ID and an SSO request to the IDaas corporation apparatus 30.

In step ST11, the authentication service unit 32 of the IDaaS corporation apparatus 30 confirms a single sign-on account and an authentication level from the SSO account information ac2 stored in the memory.

In step ST12, the authentication service unit 32 transmits login screen data used for authentication to the web browser unit 12, thereby requesting authentication information.

In step ST13, the web browser unit 12 transmits an ACBio authentication request to the authentication client unit 13.

In step ST14, the authentication client unit 13 transmits the ACBio authentication request to the authentication providing apparatus 40. The authentication providing unit 42 of the authentication providing apparatus 40 extracts information from the BRT certificate registered in the authentication account information ac3 stored in the memory 41, and executes ACBio authentication based on the ACBio authentication request.

In step ST14, based on the user ID and SSO request transmitted from the user terminal 10, the authentication providing apparatus 40 having authentication account information ac3 which is associated, by the second federation ID, with the SSO account information including the SSO account identifier identical to the user ID, executes authentication processing for the user who operates the user terminal 10.

In step ST15, the authentication client unit 13 permits the web browser unit 12 to perform control again, after the ACBio authentication request is transmitted in step ST15.

In step ST16, the web browser unit 12 transmits an authentication result to the authentication service unit 32.

In step ST17, the authentication service unit 32 confirms the authentication result from the authentication providing unit 42.

In step ST18, the authentication service unit 32 confirms that the authentication result is correct and transmits a permission of the SSO authentication to the web browser unit 12.

In step ST18, if the result of the authentication processing indicates success, the IDaaS corporation apparatus 30 having SSO account information ac2 including the SSO account identifier identical to the user ID of the user subjected to the authentication processing, permits SSO authentication to be executed for the service identified by the service account identifier included in the service account information ac1 associated with the SSO account information ac2 by the first federation ID.

In step ST19, the single sign-on authentication enables the web browser unit 12 to single sign-on the service providing apparatus 20 associated with the SSO.

After step ST19, the service providing apparatus 20 which provides the service for which the SSO authentication is permitted, transmits information related to the service to the user terminal 10 which transmitted the user ID and the SSO request in step ST10.

FIG. 5 is a sequence diagram illustrating an example of a business sequence performed when the service provider outsources the ID administration and SSO to the IDaaS corporation. This business sequence can be realized as an online sequence, an offline sequence or a sequence in which the online and offline sequences are combined.

In step ST20, the service providing apparatus 20 transmits an ID outsourcing request to the IDaaS corporation apparatus, thereby requesting (or sounding out) the outsourcing of ID management.

In step ST21, the IDaas corporation apparatus transmits a usage menu (which shows the content, price etc. of IDaaS service) to the service providing apparatus 20 in response to the ID outsourcing request.

In step ST22, the service providing apparatus 20 notifies the IDaaS corporation of the IDaaS service which the service provider selects from the usage menu.

In step ST23, a use request for using the authentication providing service corresponding to the notified IDaaS service is transmitted to the authentication providing apparatus 40.

In step ST24, the authentication providing apparatus 40 performs processing based on the use request so as to make a contract with the IDaaS corporation apparatus 30.

In step ST25, the IDaaS corporation apparatus 30 makes the contract with the service providing apparatus 20, based on the processing in step ST24.

In step ST26, the service providing apparatus 20 notifies the user terminal 10 of the start of the SSO service. The notice from the service providing apparatus 20 includes, for example, an SSO-enabled service and an SSO authentication method.

In step ST27, the user terminal 10 transmits an SSO use request (including an SSO-enabled service selected from the notice transmitted in step ST26, and a selected authentication method) to the service providing apparatus 20.

In step ST28, the service providing apparatus 20 transmits the SSO use request to the IDaaS corporation apparatus 30.

In step ST29, the IDaaS corporation apparatus 30 transmits an authentication request to the authentication providing apparatus 40, based on the SSO use request.

FIG. 6 is a schematic diagram illustrating an example of a business sequence performed when the service provider outsources the ID administration and SSO to the IDaaS corporation. This business sequence can be realized as an online sequence, an offline sequence or a sequence in which the online and offline sequences are combined.

In step ST30, the service providing apparatus 20 transmits a service fee request to the user terminal 10, thereby requesting a service fee. This service fee request is made by billing data asking for payment of the service fee corresponding to the service requested by the SSO use request made in step ST27.

In step ST31, the user of the user terminal 10 pays the service fee to the service provider, based on the service fee request. The method for payment may be an arbitrary method such as electronic fund transfer from a bank account.

In step ST32, the IDaaS corporation apparatus 30 transmits an ID management fee request (which asks for payment of the fee for the management of the user ID) to the service providing apparatus 20.

In step ST33, the service provider running the service providing apparatus 20 pays the ID management fee to the IDaaS corporation based on the ID management fee request.

In step ST34, the authentication providing apparatus 40 transmits an authentication providing fee request (which asks for payment of the fee for the authentication providing service) to the IDaaS corporation apparatus 30.

In step ST35, the IDaaS corporation running the IDaaS corporation apparatus 30 pays the authentication providing fee to the authentication provider based on the authentication providing fee request.

Figure 7:
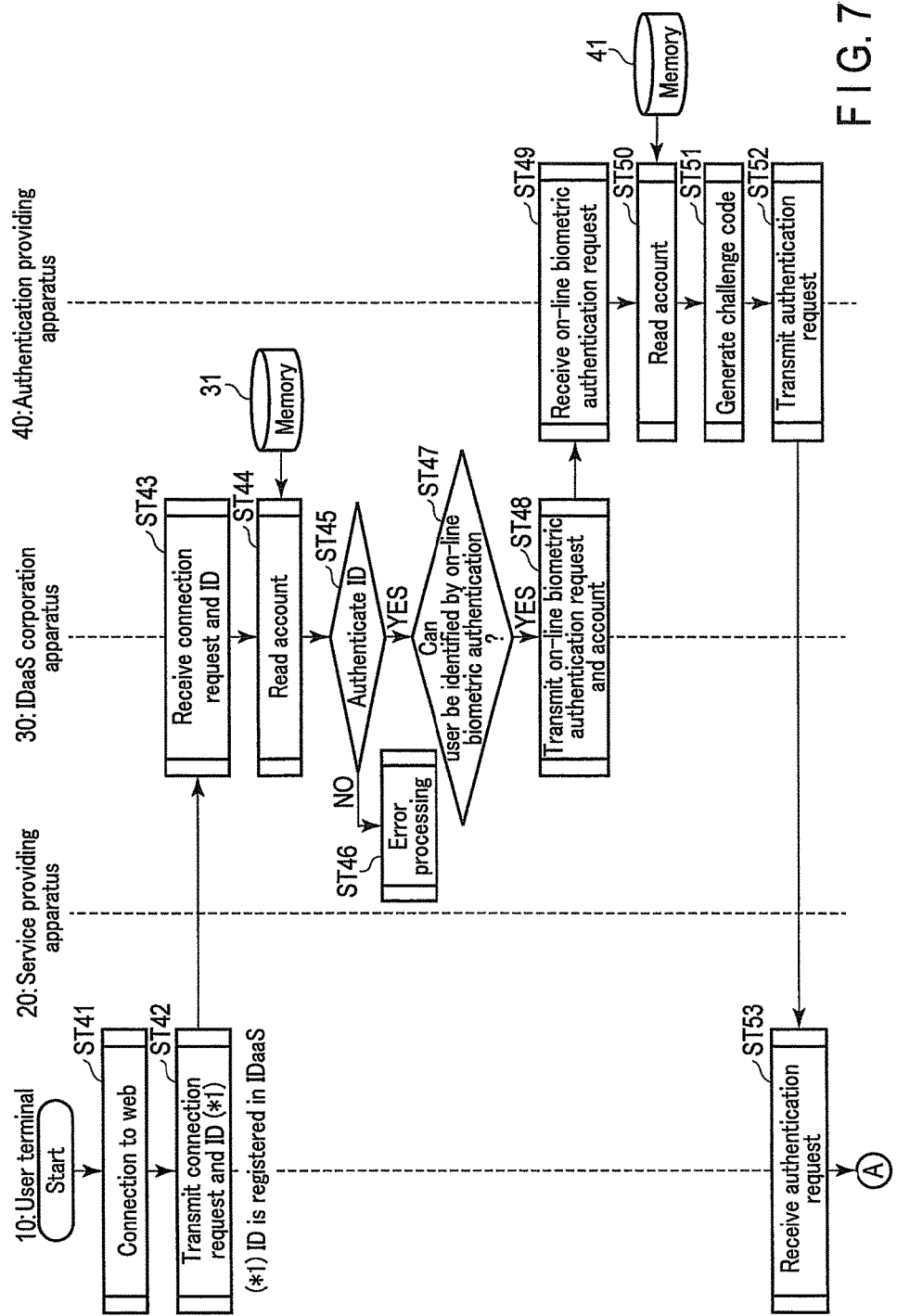
FIG. 7 is a flowchart illustrating an example of an operation in the embodiment.
Figure 8:
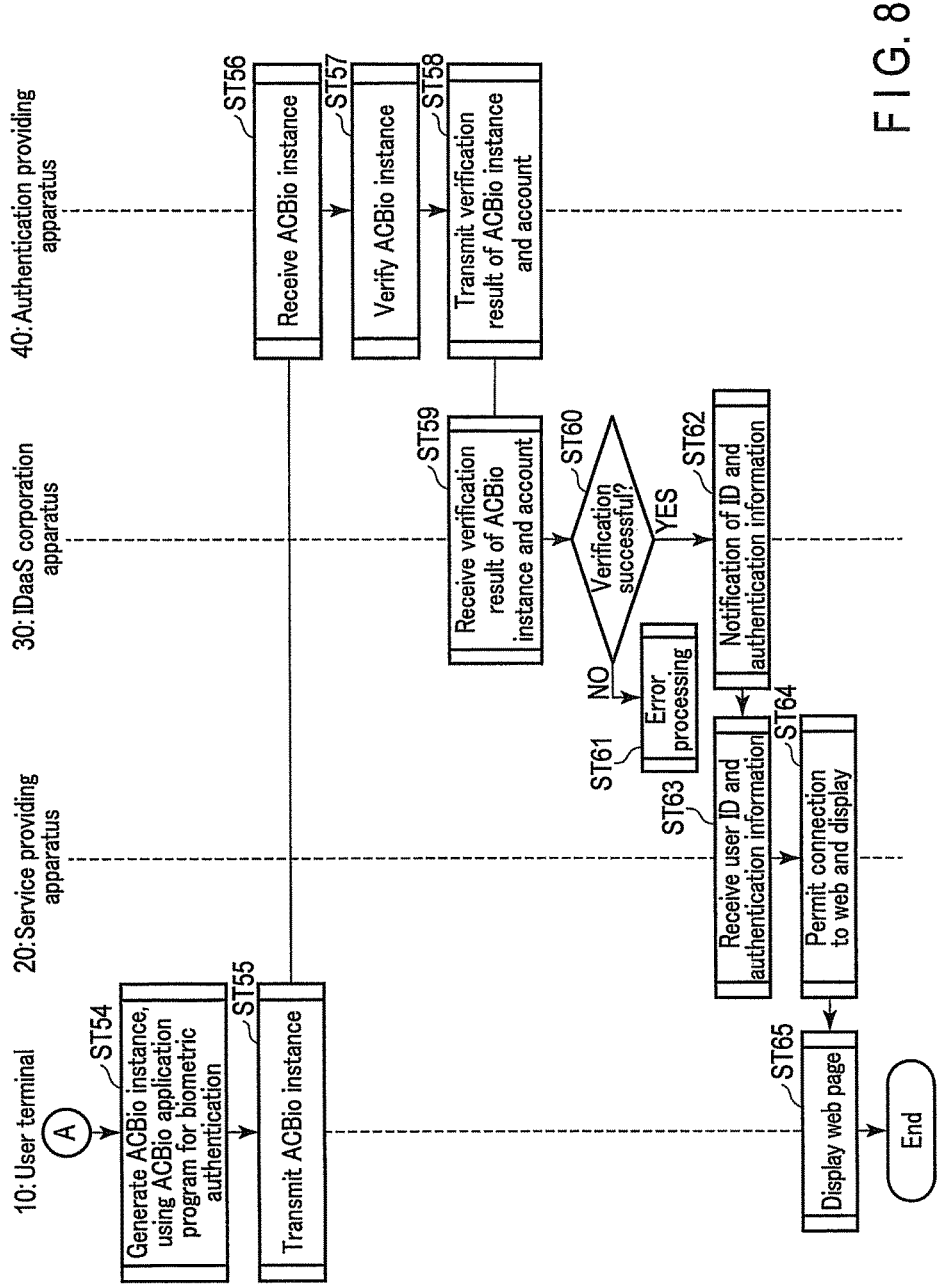
FIG. 8 is a flowchart illustrating an example of an operation in the embodiment.

FIG. 7 and FIG. 8 are flowcharts illustrating an example of an operation that is started when the user makes a login request to a web site of the service provider and is ended when that user logs in to the web site. In this example, the service provider outsources the ID management to the IDaas corporation. The IDaaS corporation employs an authentication provider. The example is based on the premise that the authentication provider uses on-line authentication ACBio, which does not transmit biological information on a network.

In step ST41, the user terminal 10 requests connection to a web site in response to the operation by the user U.

In step ST42, the web application actuated in step ST41 transmits a user ID (of the user requesting the connection to the web site) and a connection request to the IDaaS corporation apparatus 30. The connection request may be regarded as an SSO request.

In step ST43, the IDaaS corporation apparatus 30 receives the user ID and the connection request.

In step ST44, the IDaaS corporation apparatus 30 reads SSO account information ac2 from the memory 31 in response to the receipt of the connection request.

In step ST45, the IDaaS corporation apparatus 30 executes ID authentication based on the read SSO account information, thereby determining whether the user ID received in step ST43 is correct.

In step ST46, the IDaaS corporation apparatus 30 executes error processing if the determination made in step ST45 is not correct.

In step ST47, executed if the determination made in step S45 is correct, the IDaaS corporation apparatus 30 refers to the SSO account information ac2 and determines whether or not the user indicated by the user ID can be identified by on-line biometric authentication. In this example, it is assumed that the user can be identified by on-line biometric authentication. Therefore, reference to the processing performed if the determination result in step ST47 is "NO" will be omitted.

In step ST48, the IDaaS corporation apparatus 30 transmits an on-line biometric authentication request and SSO account information ac2 to the authentication providing apparatus 40.

In these steps ST43 to ST48, based on the user ID and SSO request transmitted from the user terminal 10, the IDaaS corporation apparatus 30 transmits an authentication request to the authentication providing apparatus 40 having authentication account information ac3 which is associated, by the second federation ID, with the SSO account information ac2 including the SSO account identifier identical to the user ID.

In step ST49, the authentication providing apparatus 40 receives the on-line biometric authentication request and account.

In step ST50, the authentication providing apparatus 40 reads AP account information ac3 from the memory 41 based on the SSO account information ac2.

In step ST51, executed after the AP account information ac3 is confirmed in step ST50, the authentication providing apparatus 40 generates a challenge code required for the ACBio authentication.

In step ST52, the authentication providing apparatus 40 transmits the ACBio authentication request to the user terminal 10, along with the challenge code.

In step ST53, the user terminal 10 receives the challenge code and the authentication request.

In step ST54, the user terminal 10 generates an ACBio instance, using an ACBio application program installed as an authentication client unit 13 for biometric authentication. The ACBio instance includes result information of the biometric authentication, a challenge code, a BRT certificate, etc.

In step ST55, the user terminal 10 transmits the generated ACBio instance to the authentication providing apparatus 40.

In step ST56, the authentication providing apparatus 40 receives the ACBio instance.

In step ST57, the authentication providing apparatus 40 verifies the received ACBio instance. For example, the result information of the biometric authentication, challenge code, and BRT certificate, which are included in the ACBio instance, are verified.

In step ST58, the authentication providing apparatus 40 transmits the verification result of the ACBio instance and the SSO account information ac2 received in step ST49, to the IDaaS corporation apparatus 30.

In steps ST49-ST52 and ST56-ST58, the authentication providing apparatus 40 performs authentication processing for the user who operates the user terminal 10, based on the authentication request received from the IDaaS corporation apparatus 30, and transmits the result of the authentication processing to the IDaaS corporation apparatus 30.

In step ST59, the IDaaS corporation apparatus 30 receives the verification result of the ACBio instance and the SSO account information ac2 from the authentication providing apparatus 40.

In step ST60, the IDaaS corporation apparatus 30 determines whether or not the ACBio verification result indicates success.

In step ST61, the IDaaS corporation apparatus 30 executes error processing if the determination made in step ST60 does not indicate success.

In step ST62, executed if the determination made in step ST60 indicates success, the IDaaS corporation apparatus 30 extracts a user ID from the SSO account information ac2 received in step ST59, and notifies the service providing apparatus 20 of the extracted user ID along with the authentication information representing the authentication success.

In steps ST59-ST62, if the result of the authentication processing indicates success, the IDaaS corporation apparatus 30 permits SSO authentication to be executed for the service identified by the service account identifier included in the service account information ac3 associated, by the first federation ID, with the SSO account information ac2 including the SSO account identifier identical to the user ID subjected to the authentication processing, and the IDaaS corporation apparatus 30 transmits the permission to the service providing apparatus 20.

In step ST63, the service providing apparatus 20 receives the user ID and authentication information and permits authentication to be performed based on the user ID.

In Step ST64, the service providing apparatus 20 permits the connection to the web page and the display of that web page, based on the user ID and connection request received in step ST43.

In steps ST63 and ST64, the service providing apparatus 20 transmits information related to the service for which the SSO authentication is permitted, to the user terminal 10 which transmitted the user ID and the SSO request in step ST.

In step S65, the user terminal 10 displays an accessible web page based on the successful login.

A description will now be given of the case where the administrator of the authentication provider changes the level of a particular authentication method, for an external reason such as a vulnerability report. The authentication providing apparatus 40 is provided with a memory 41 storing an authentication class management table T1, and an authentication class representing the authentication method and an authentication level representing the level of the authentication processing are described in the authentication class management table T1 in association with each other. The SSO account information ac2 includes an authentication level.

If something is wrong with the authentication processing, and the level of that authentication deteriorates, the authentication providing apparatus updates the authentication class management table T1 in such a manner as to lower the authentication level of the authentication processing, and transmits to the IDaaS corporation apparatus 30 the lowered authentication level and the authentication class associated therewith in the authentication account information ac3.

Upon receipt of the authentication level and authentication class from the authentication providing apparatus 40, the IDaaS corporation apparatus 30 searches the SSO account information ac2 based on the received authentication class, and updates the SSO account information ac2 such that the authentication level searched for is lowered to the received authentication level.

Figure 9:
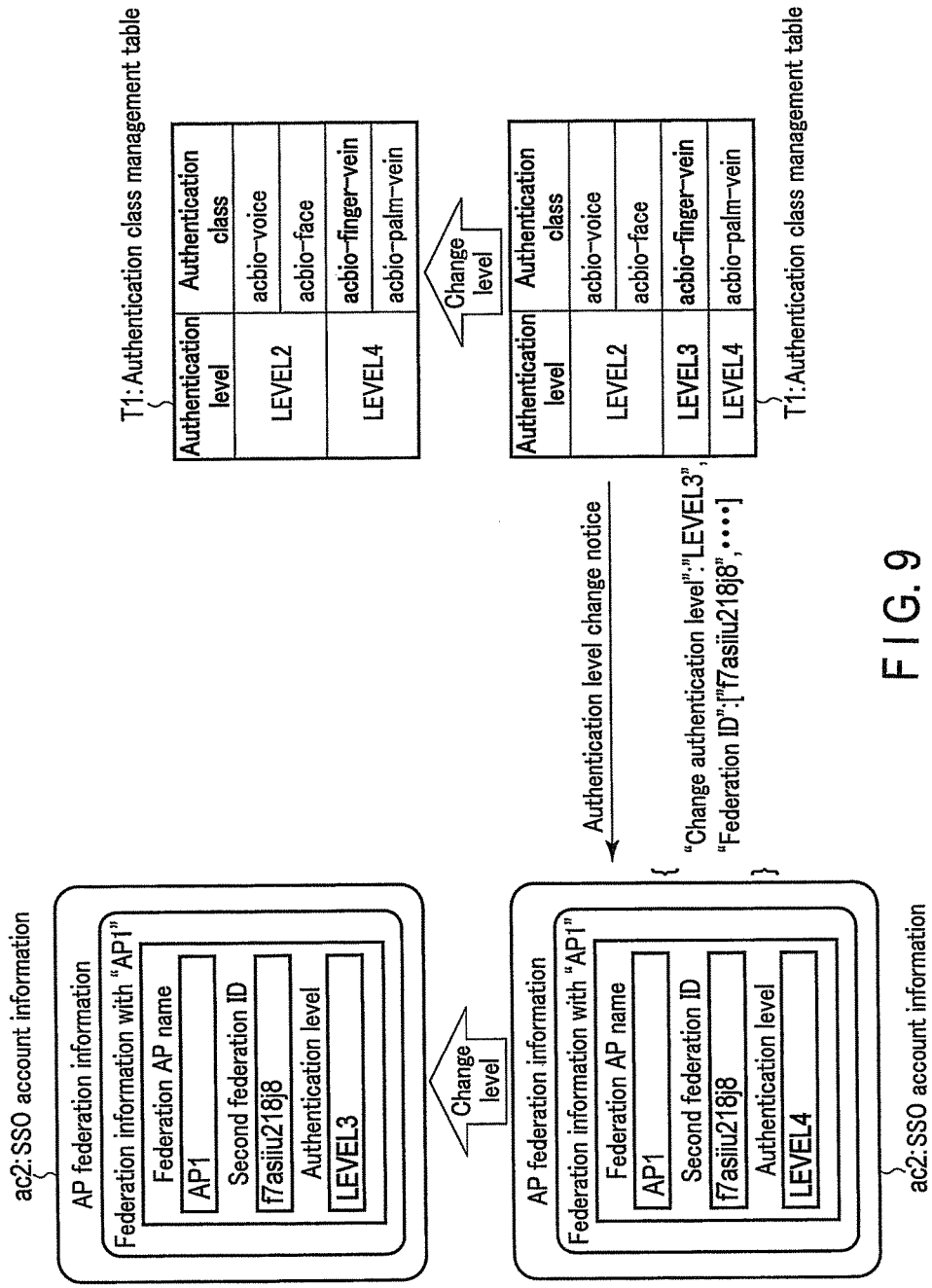
FIG. 9 is a schematic diagram illustrating an example of an operation in the embodiment.

For example, as shown in FIG. 9, where the authentication level of the authentication class "acbio-finger-vein" of the authentication class management table T1 is changed from "LEVEL 4" to "LEVEL 3", the authentication providing apparatus 40 transmits an authentication level change notice (including authentication level "LEVEL 3" and federation ID "f7asiiu218j8") to the IDaaS corporation apparatus 30.

Based on the authentication level change notice, the IDaaS corporation apparatus 30 changes the authentication level in the AP federation information included in the SSO account information ac2 of each user ID, from "LEVEL 4" to "LEVEL 3."

According to the first embodiment described above, based on the user ID and SSO request transmitted from the user terminal 10, the authentication providing apparatus 40 having authentication account information ac3 which is associated, by the second federation ID, with the SSO account information ac2 including the SSO account identifier identical to the user ID, executes authentication processing for the user who operates the user terminal 10.

If the result of the authentication processing indicates success, the IDaaS corporation apparatus 30 having SSO account information ac2 including the SSO account identifier identical to the user ID of the user subjected to the authentication processing, permits SSO authentication to be executed for the service identified by the service account identifier included in the service account information ac3 associated with the SSO account information ac2 by the first federation ID.

The service providing apparatus 20 which provides the service for which the SSO authentication is permitted, transmits information related to the service to the user terminal 10 which transmitted the user ID and the SSO request.

According to the first embodiment, the features described above enable the authentication method to be easily changed, with the convenience of the user and the service provider being enhanced.

According to the first embodiment, if something is wrong with the authentication processing, and the level of that authentication deteriorates, the authentication providing apparatus 40 updates the authentication class management table T1 in such a manner as to lower the authentication level of the authentication processing, and transmits to the IDaaS corporation apparatus 30 the lowered authentication level and the authentication class associated therewith in the authentication account information ac3. Upon receipt of the authentication level and authentication class from the authentication providing apparatus 40, the IDaaS corporation apparatus 30 searches the SSO account information ac2 based on the received authentication class, and updates the SSO account information ac2 such that the authentication level searched for is lowered to the received authentication level. Because of the features described above, if something is wrong with the authentication processing, and the level of that authentication deteriorates, the first embodiment lowers the authentication level, and the reliability of the authentication processing can be maintained.

The following is a supplemental description of the advantages of the first embodiment.

According to the first embodiment, authentication service is performed for the IDaaS corporation, and the IDaas enables the user of the service provider to select an authentic method as an option.

Accordingly, the convenience of the user and the service provider can be enhanced, as originally intended, and the user and service provider can select a security service with a high degree of freedom.

In addition, the IDaaS only manages IDs, and the authentication provider only performs authentication and does not manage IDs. Since the method of the IDaaS and the method of the authentication provider are loosely coupled, the authentication can be managed and operated in a simple manner.

Since the authentication service is separate from the IDaaS in the first embodiment, the following advantages (a) to (d) can be obtained:

(a) Advantages for Service Provider

Since the service provider outsources the ID management to the IDaas corporation, the following advantages on the operation side can be obtained:

The service provider does not have to build up a trusting relationship with the ID provider or another service provider, for the federation and management of user information.

The service provider does not have to monitor a status of ID management in real time.

In general, if there are a plurality of systems with which a trusting relationship is built up, an individual setting is required for each of the systems, resulting in a complicated manner of operation. Complicated management, including the setting and operation of systems, can be outsourced according to the first embodiment.

Since the ID management is outsourced, the service provider does not have to manage IDs by itself, and the risk of leaking ID information from the service provider can be eliminated.

The service provider can select an authentication method which the IDaaS corporation offers as an option. The service provider can easily introduce biometric authentication, which would require a great deal of preparation and operation if it is created by the service provider. The service provider does not have to prepare a secure management environment by itself.

If biometric authentication is introduced, the service provider enables the user to enjoy the service even if the user forgets authentication information.

Even if high-security authentication is required for a limited number of users in the service of one service provider, there may be a case where more users enjoy the services of other service providers and use the IDaas in the SSO authentication. In such a case as well, high-security authentication (such as biometric authentication) can be presented to the users.

(b) Advantages for the IDaaS Corporation

Since the IDaaS corporation can outsource the authentication service to the authentication provider, the use service which the IDaaS corporation provides to the service provider and the user can be improved.

Since the IDaaS corporation can outsource the authentication methods, an increased number of authentication methods can be presented for IDs. In addition, the loosely-coupled methods can be separated, if so desired. As a result, a more secure authentication method can be selected in accordance with requests of the user and the service provider. In addition, the IDaaS corporation can promptly take steps for a high-security authentication method.

With respect to resources using an authentication method and a management method which cannot be easily put to practice (such as biometric authentication), the IDaaS corporation does not have to prepare such resources by itself. It can use existing resources.

The IDaaS corporation executes authentication in response to requests made by a plurality of service providers. Therefore, the IDaaS corporation can provide a high-security service even to a group of small-entity service providers.

(c) Advantages for the Authentication Provider

Since the authentication provider provides authentication for the IDaaS corporation, the authentication it provides can be highly professional and secure.

Since the user information associated with IDs is possessed by the IDaaS corporation, the authentication provider does not have to manage the user information.

The authentication provider can provide its authentication service not only to the service provider but also to an unspecified number of persons who wish to enjoy the authentication service through the IDaaS.

(d) Advantages for the User

The convenience of the user is enhanced as described below. The user can use the authentication service provided by the IDaaS. To make the authentication secure, the user can select an option (such as biometric authentication) from an increased number of options available. In addition, the user merely uses the IDaaS for single sign-on (SSO) and does not have to remember the user IDs registered for the respective service providers.

<Second Embodiment>

An authentication system according to the second embodiment will be described with reference to FIG. 1.

The second embodiment is a modification of the first embodiment and is featured in that the load required for changing the authentication level is reduced.

For example, when the authentication level is changed, the first embodiment has to change the attributes (supported authentication levels) of the SSO account information ac2 on all users. For this reason, if the number of accounts is very large, a heavy load is imposed when an authentication level is changed according to the first embodiment.

According to the second embodiment, as shown in FIG. 10, the IDaaS corporation apparatus 30 is provided with a memory 31 storing an authentication level management table T2 in which an authentication level and an authentication class index are described in association with each other. The authentication class index is an index expressing both the name of an authentication provider (AP name) and an authentication class.

The authentication providing apparatus 40 comprises a memory 41 storing an authentication class management table T1 in which an authentication class representing the authentication method, an authentication level representing the level of the authentication processing and an authentication class index including the name of the authentication provider of the authentication class are described in association with one another.

As shown in FIG. 11, in the SSO account information ac2 managed by the IDaaS corporation apparatus 30, the AP federation information includes an authentication class index in place of the authentication level.

Figure 12:
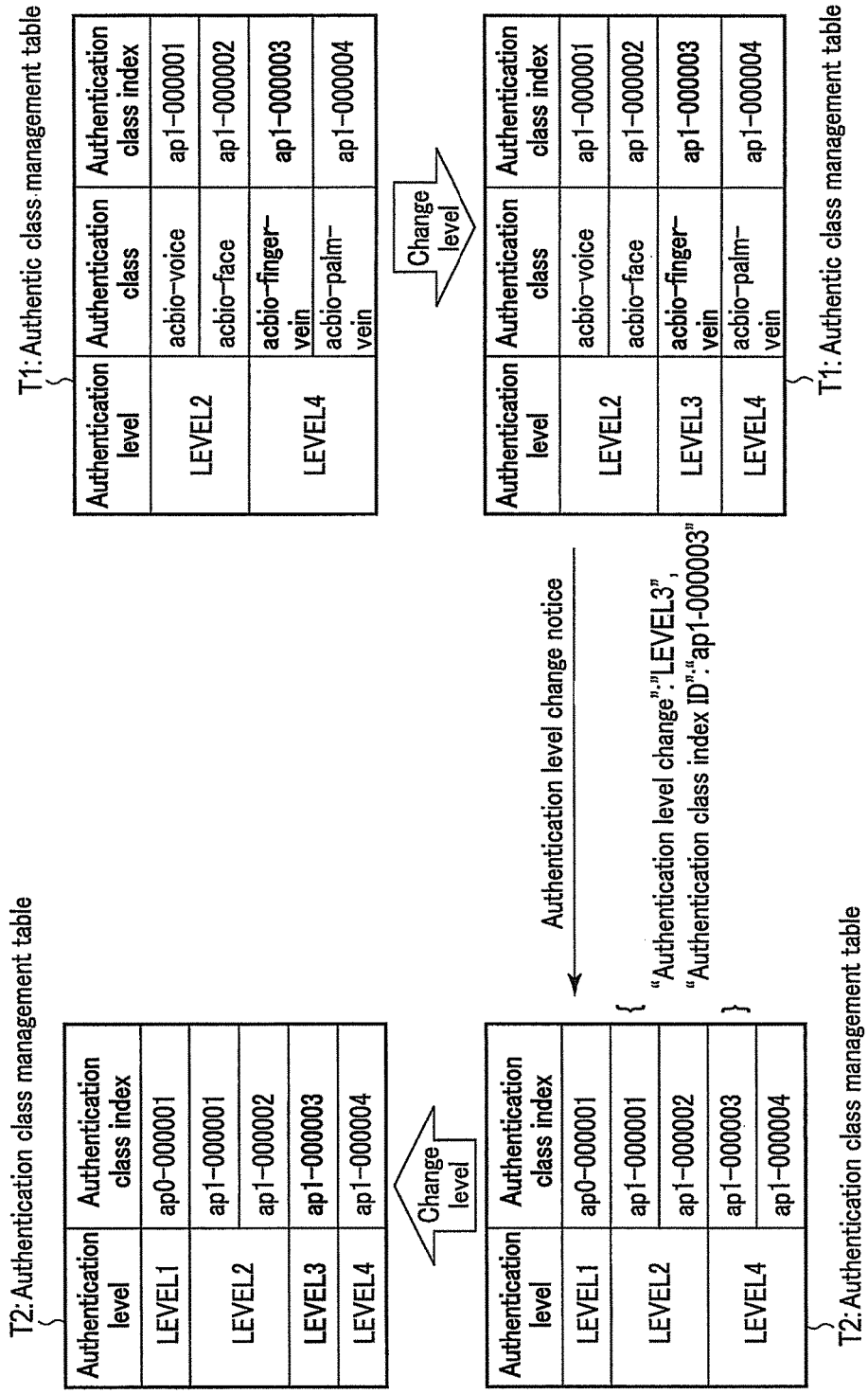
FIG. 12 is a schematic diagram illustrating an example of an operation in the embodiment.

As shown in FIG. 12, the second embodiment is only required to rewrite the tables T1 and T2 in order to change the authentication level; it does not have to rewrite the SSO account information ac2.

To be more specific, if something is wrong with the authentication processing, and the level of that authentication deteriorates, the authentication providing apparatus 40 updates the authentication class management table T1 in such a manner as to lower the authentication level of the authentication processing, and transmits to the IDaaS corporation apparatus 30 the authentication level lowered in the authentication class management table T1 and the authentication class index associated therewith.

Upon receipt of the authentication level and authentication class index from the authentication providing apparatus 40, the IDaaS corporation apparatus 30 searches the authentication level management table T2 based on the received authentication class index, and updates the authentication level management table T2 such that the authentication level searched for is lowered to the received authentication level.

In this manner, the tables T1 and T2 are rewritten. The method for rewriting the tables T1 and T2 may be modified such that the IDaaS corporation apparatus 30 first rewrites the authentication level management table T2 and then the authentication providing apparatus 40 rewrites the authentication class management table T1. This modification will be mentioned in relation to steps ST91 to ST93.

The authentication processing is performed in the same way as in the first embodiment.

An operation of the authentication system having the above configurations will be described.

Figure 13:
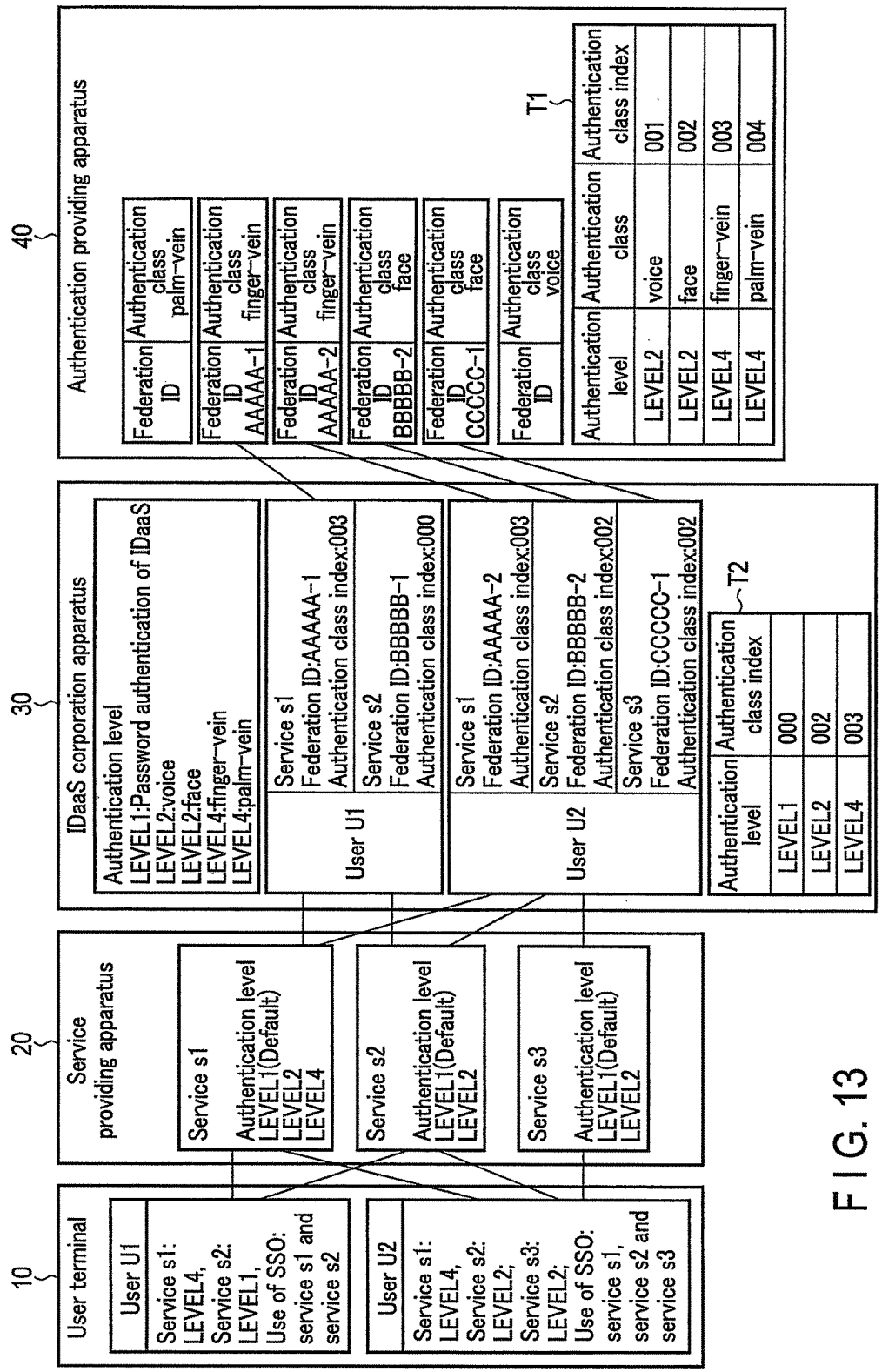
FIG. 13 is a schematic diagram illustrating an example of how an authentication level is managed in the embodiment.

FIG. 13 is a schematic diagram illustrating an example of how an authentication level is managed by the IDaaS corporation.

In actuality, there are many user terminals 10, many service providing apparatuses 20, many IDaaS corporation apparatuses 30, and many authentication providing apparatuses 40, but only one of each of these is illustrated in FIG. 13 for the sake of simplicity.

In the example shown in FIG. 13, users U1 and U2 have authentication levels for the respective services for which the SSO authentication is used.

The user terminal 10 can freely select authentication levels of the services provided by the service providing apparatus 20 in accordance with the operations performed by users U1 and U2.

The service providing apparatus 20 can present to, the user an available authentication level for each of the services. In addition, the service providing apparatus 20 can select an authentication level corresponding to the presented authentication level from the IDaaS corporation apparatus 30, for each of the services, and determines that authentication level.

The IDaaS corporation apparatus 30 can present, to the service providing apparatus 20, a plurality of authentication levels that can be used in the authentication processing performed by the authentication providing apparatus 40.

The IDaaS corporation apparatus 30 manages the service of the service providing apparatus 30 and the authentication class index for each user ID. By means of the authentication level management table T2, the IDaaS corporation apparatus 30 can manage an authentication level and an authentication class index in association with each other.

By means of the authentication class management table T1, the authentication providing apparatus 40 manages an authentication level, an authentication class and an authentication class index in association with each other.

As long as integrated management is performed by the IDaaS corporation apparatus 30, users U1 and U2 operating the user terminal 10 are not conscious of the IDs of the respective services at the time of SSO authentication.

If a problem occurs on the network, the authentication levels in the tables T1 and T2 are lowered, thereby restricting the access to the service providing apparatus 20. When the problem is solved, the authentication levels in the tables T1 and T2 can be raised.

If necessary, the authentication performed by the authentication providing apparatus 40 can be temporarily suspended as an emergency measure.

The IDaaS corporation apparatus 30 can employ the authentication providing apparatus 40 as an authentication apparatus that performs authentication processing for the service providing apparatus 20 and the user terminal 10. For this reason, the IDaaS corporation apparatus 30 does not have to provide an environment for biometric authentication by itself.

The authentication providing apparatus 40 has different authentication levels for the respective authentications to be performed.

The authentication providing apparatus 40 does not manage user IDs or user information.

All apparatuses 10-40 are multiplexed and are authenticated by the loose coupling among them.

Figure 14:
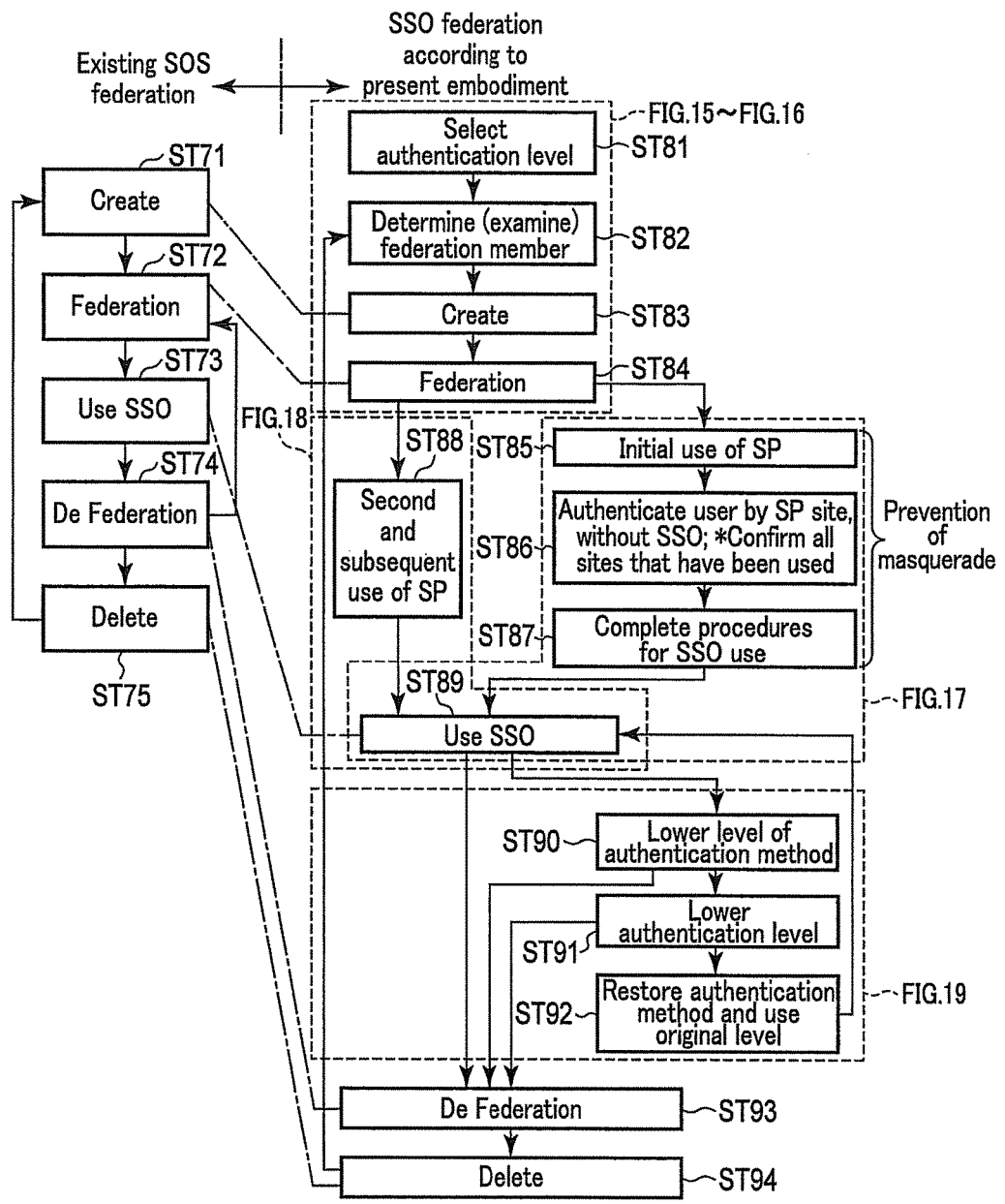
FIG. 14 is a flowchart illustrating an example of an operation in the embodiment.

FIG. 14 is a flowchart illustrating an example of an SSO federation operation performed by the IDaaS corporation apparatus 30. Steps ST71 to ST75 shown on the left side of FIG. 14 are existing SOS federation operations.

In step ST71, SSO is created.

In step ST72, the SSO is federated.

In step ST73, the SSO is used.

In step ST74, the federation of the SSO is canceled (de-federation).

In step ST75, the SSO is deleted.

Steps ST81 to ST94 shown on the right side of FIG. 14 are examples of the SSO federation operations according to the present embodiment.

In step ST81, the IDaaS corporation selects an SSO authentication level.

In step S82, the IDaaS corporation apparatus 30 determines (examines) an SSO federation member.

In step ST83, the authentication system creates SSO. In step ST84, the authentication system federates the SSO.

In Step ST85, the user uses a service provider (SP) to which initial connection is performed. When the SP connected second time is used, the processing flows advances to step ST88, not to step ST85.

In step ST86, the user is authenticated by the SP site, without the SSO.

If the user is authenticated by the SP, the use of the SSO is started in step ST87.

In step ST89, the user uses the SSO.

If something is wrong with the authentication method, the IDaaS corporation determines in step ST90 that the level of the authentication lowers.

In step ST91, the IDaaS corporation apparatus 30 and the authentication providing apparatus 40 lower the authentication level.

When the problem with the authentication method is solved, the IDaaS corporation apparatus 30 and the authentication providing apparatus 40 raise the authentication level back to the original level in step ST92.

In step ST93, the authentication system cancels the SSO.

In step ST94, the authentication system deletes the SSO.

Figure 15:
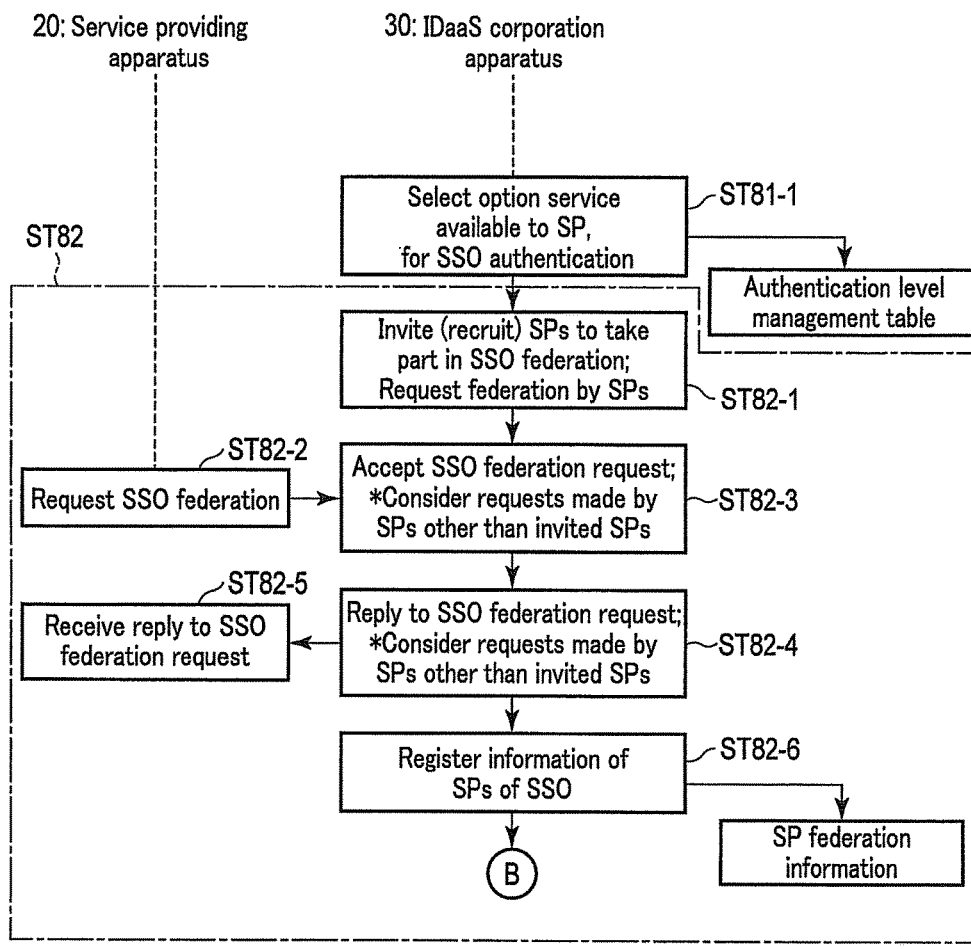
FIG. 15 is a flowchart illustrating an example of an operation in the embodiment.
Figure 17:
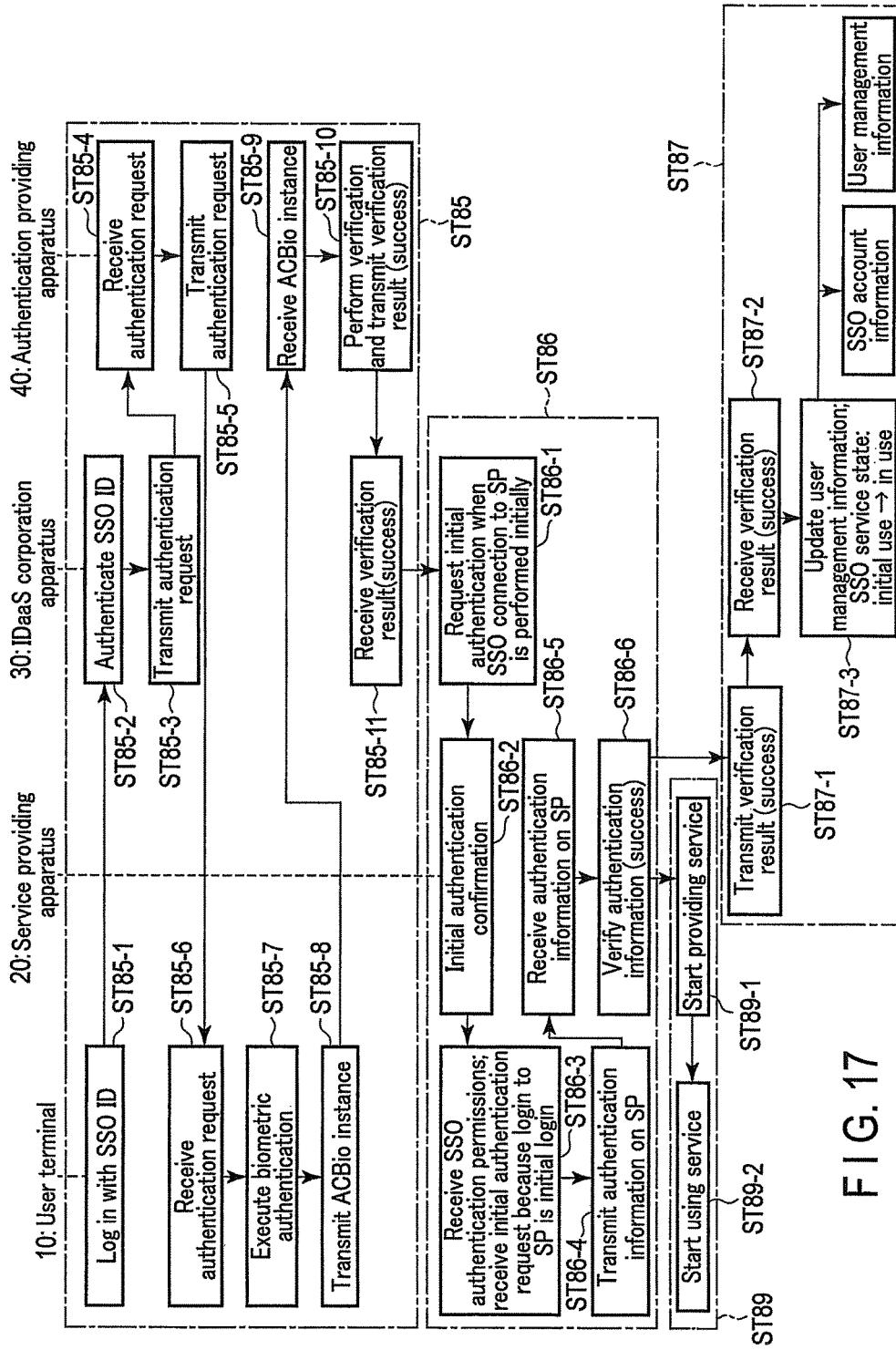
FIG. 17 is a flowchart illustrating an example of an operation in the embodiment.

Steps ST81-ST92 of the present embodiment will be described with reference to the flowchart shown in FIGS. 15-19. FIGS. 15 and 16 will be used for the explanation of steps ST81-ST84, FIG. 17 will be used for the explanation of steps ST85-87 and ST89, FIG. 18 will be used for the explanation of steps ST88 and ST89, and FIG. 19 will be used for the explanation of steps ST90-ST92.

In step ST81-1, the IDaaS corporation selects an option service available to the SP, for SSO authentication. The option service refers to authentication processing other than an ordinary password, such as the use of a one-time password (OTP), the use of biometric authentication, the use of biometric authentication and ACBio, or the like. The IDaaS corporation first determines an authentication level and registers the authentication level in the authentication level management table T1.

In Step 82-1, the IDaaS corporation apparatus 30 invites (recruits) service providers, for which federation is requested by the IDaaS corporation, to take part in the SSO federation for the SP.

In steps ST82-2, the service providing apparatus 20 transmits the SSO federation request to the IDaaS corporation apparatus 30.

In step S82-3, the IDaaS corporation apparatus 30 accepts the SSO federation request.

In step S82-4, the IDaaS corporation apparatus 30 transmits, to the service providing apparatus 20, a result indicating that the SSO federation request is accepted. For ensuring the safety between the SPs of the SSO federation, the IDaaS corporation apparatus 30 carries out a detailed examination of the SPs.

In step ST82-5, the service providing apparatus 20 receives the result of the SSO federation request.

In step S82-6, the IDaaS corporation apparatus registers the SP federation information in the memory 31.

In step S82-7, the IDaaS corporation apparatus 30 announces the start of the SSO service to users.

In step ST83-1, the user terminal 10 transmits an ID registration request for the SSO to the IDaaS corporation apparatus 30 in response to the operation performed by the user. The ID of the IDaaS corporation and the original ID may be used, if so desired.

In step S83-2, the IDaaS corporation apparatus 30 accepts the ID registration request for the SSO and registers the new ID.

In step S83-3, the IDaaS corporation apparatus 30 transmits, to the user terminal 10, menu information used for permitting the user to confirm the authentication method.

In step ST83-4, the user terminal 10 selects an authentication, method from the menu and designates the selected method, in accordance with the operation performed by the user. In this example, the user selects and designates ACBio authentication provided by the IDaaS corporation apparatus 30 and offered by the authentication providing apparatus 40.

In step S83-5, the IDaaS corporation apparatus 30 accepts the authentication method entered from the user terminal 10.

If the accepted authentication method utilizes the authentication providing apparatus 40, the IDaaS corporation apparatus 30 transmits an authentication use request to the authentication providing apparatus 40 in step ST83-6.

The IDaaS corporation apparatus 30 issues an account related to the SSO and transmits that account to the authentication apparatus 40.

In Step ST83-7, the authentication providing apparatus 40 transmits an authentication information registration request to the user terminal 10, based on the account information received from the IDaaS corporation apparatus 30. The authentication information registration request includes a challenge code.

In step ST83-8, the user terminal 10 acquires biometric information on the user based on the authentication information registration request, and generates ACBio instance including both a hashed value of the biometric information and the challenge code included in the registration request. The user terminal 10 transmits the generated ACBio instance to the authentication providing apparatus 40.

In step ST83-9, the authentication providing apparatus 40 issues a BRT certificate of the ACBio, based on the ACB instance, and transmits the BRT certificate to the user terminal 10.

In step ST83-10, the user terminal 10 registers the authentication information including the BRT certificate and transmits an authentication completion notice to the authentication providing apparatus 40.

In step ST83-11, the authentication providing apparatus 40 accepts this authentication completion notice.

In step ST83-12, the authentication providing apparatus 40 registers the authentication information including the BRT certificate and operates with respect to the account. After confirming the operation with respect to the account, the authentication providing apparatus 40 transmits an authentication registration result to the IDaaS corporation apparatus 30. In this example, it is assumed that the authentication registration is performed successfully. If the authentication registration is not performed successfully, the processing of steps ST83-7 to ST83-11 is performed again.

In step ST83-13, the IDaaS corporation apparatus 30 accepts the result of the authentication registration, confirms that the authentication use request is accepted, and notifies the user terminal 10 of the completion of the registration of the SSO ID.

In step ST83-14, the user terminal 10 accepts the notice of the completion of the registration of the SSO ID.

In step ST84-1, the IDaaS corporation apparatus 30 registers the SSO ID information in the memory 31 and updates the user management information on the related user.

In step ST85-1, the user terminal 10 logs in with the SSO ID in response to the operation performed by the user.

In step S85-2, the IDaaS corporation apparatus 30 authenticates the SSO. ID entered from the user terminal 10.

In step ST85-3, the IDaaS corporation apparatus 30 transmits either a password authentication request or an ACBio authentication request to the authentication providing apparatus 40. In the description below, reference will be made to the case where the ACBio authentication request for on-line biometric authentication is transmitted.

In step ST85-4, the authentication providing apparatus 40 accepts this authentication request.

In step ST85-5, the authentication providing apparatus 40 transmits an authentication request to the user terminal 10 based on the accepted authentication request.

In step ST85-6, the user terminal 10 receives this authentication request.

In step ST85-7, the user terminal 10 executes the biometric authentication of the user in response to the received authentication request and generates an ACBio instance including an authentication result.

In step ST85-8, the generated ACBio instance is transmitted to the authentication providing apparatus 40.

In step ST85-9, the authentication providing apparatus 40 receives the ACBio instance.

In step ST85-10, the authentication providing apparatus 40 verifies this ACBio instance and transmits a verification result to the IDaaS corporation apparatus 30.

In step ST85-11, the IDaaS corporation apparatus 30 receives the verification result from the authentication providing apparatus 40.

In step S86-1, the IDaaS corporation apparatus 30 transmits an initial authentication request (which is made when SSO connection to the service providing apparatus 20 is performed initially) to the service providing apparatus 20.

In step ST86-2, based on that initial authentication request, the service providing apparatus 20 transmits an initial authentication request to the user terminal 10, including information representing that the connection to the service providing apparatus 20 is the initial SSO connection.

In step ST86-3, the user terminal 10 receives the initial authentication request from the service providing apparatus 20.

In step ST86-4, the user terminal 10 prompts the user to enter authentication information to be transmitted to the service providing apparatus 20, and transmits the entered authentication information to the service providing apparatus 20.

In step ST86-5, the service providing apparatus 20 receives authentication information from the user terminal 10 as a response to the authentication request made in step ST86-2.

In step ST86-6, the service providing apparatus 20 verifies the received authentication information. It is assumed here that the verification is performed successfully.

In steps ST87-1, the service providing apparatus 20 transmits a verification result representing that the initial authentication is successful to the IDaaS corporation apparatus 30.

In step ST87-2, the IDaaS corporation apparatus 30 receives the verification result from the service providing apparatus 20.

In step ST87-3, the IDaaS corporation apparatus 30 updates the SSO account information and user management information stored in the memory, based on the received verification result.

In step ST89-1, executed after the verification in step ST86-6, the service providing apparatus 20 starts providing a service to the user.

In step ST89-2, the user terminal 10, for which the service is provided by the service providing apparatus 20, is allowed to continuously enjoy the service.

Figure 18:
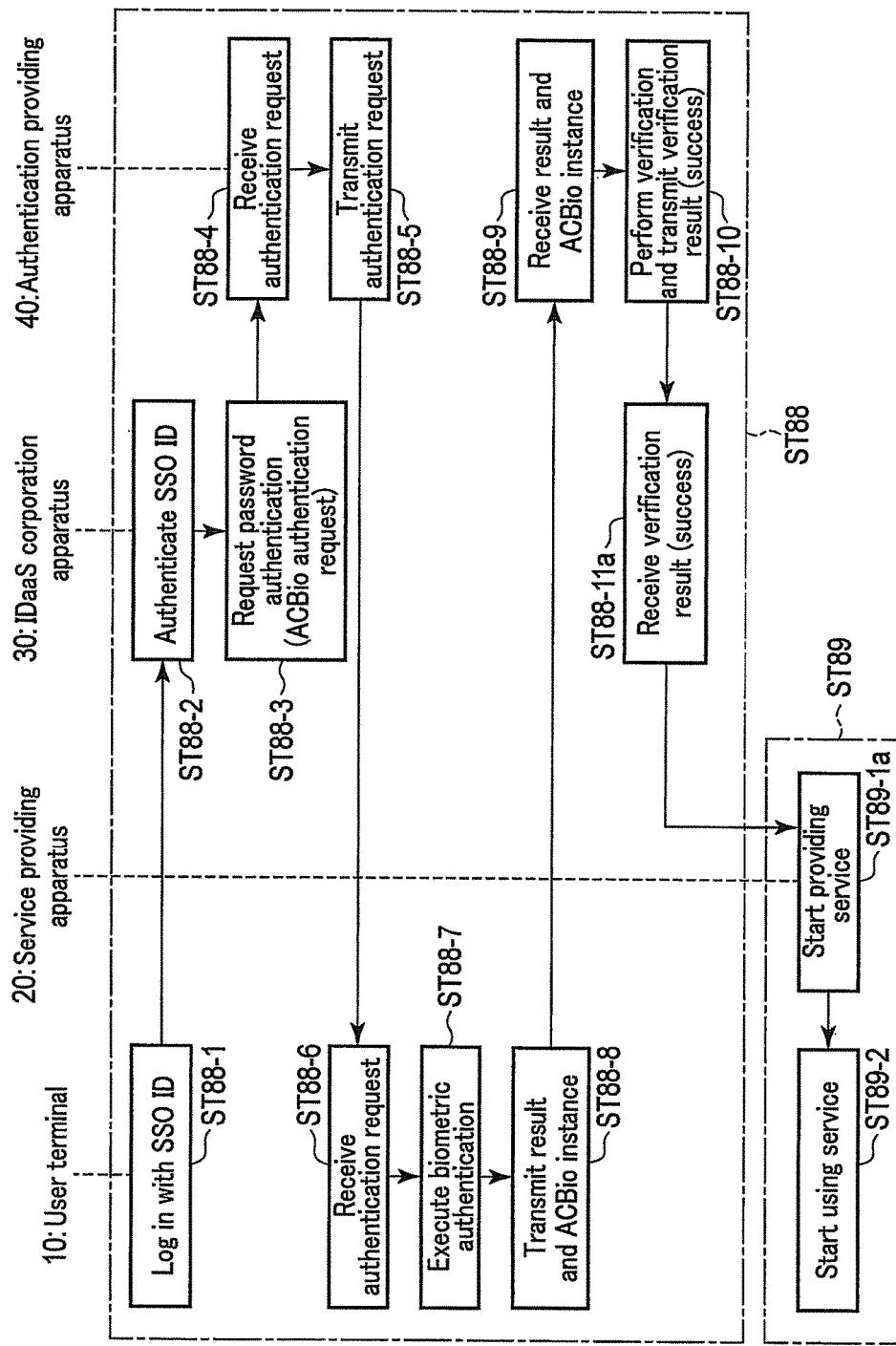
FIG. 18 is a flowchart illustrating an example of an operation in the embodiment.

FIG. 18 is a flowchart illustrating how the SSO connection to the service providing apparatus 20 is performed second and subsequent times.

The processing in step ST88-1 to step ST88-10 is performed in the same way as the above-mentioned processing in step ST85-1 to step ST85-10. In step ST88-10, the authentication providing apparatus 40 verifies an ACBio instance and transmits a verification result to the IDaaS corporation apparatus 30.

In step ST88-11a, the IDaaS corporation apparatus 30 receives the verification result from the authentication providing apparatus 40 and transmits a notice representing the completion of the verification in step ST88-10 to the service providing apparatus 20.

In step ST89-1a, executed after the verification in step ST88-10, the service providing apparatus 20 starts providing a service to the user.

In step ST89-2, the user terminal 10, for which the service is provided by the service providing apparatus 20, is allowed to continuously enjoy the service.

Figure 19:
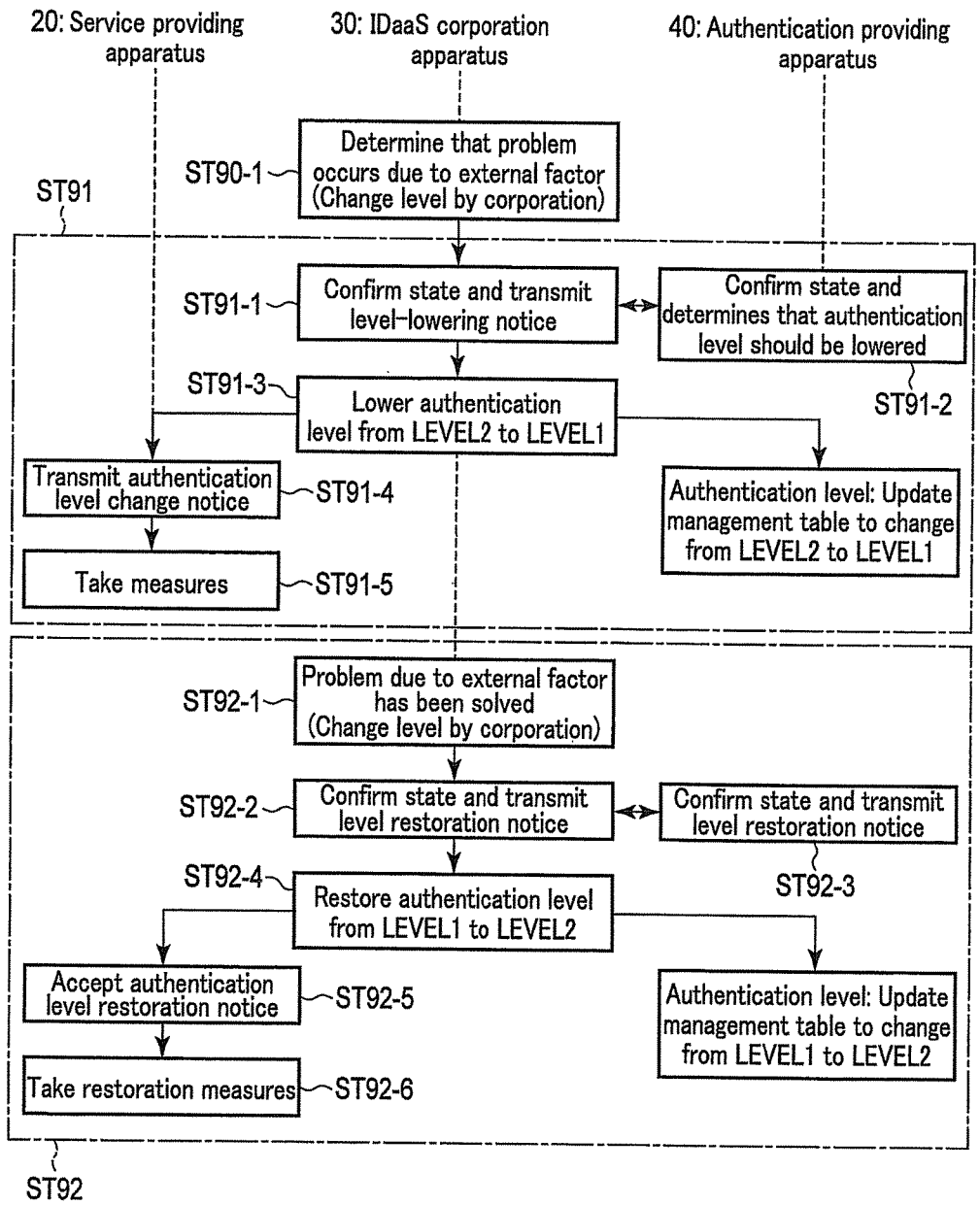
FIG. 19 is a flowchart illustrating an example of an operation in the embodiment.

FIG. 19 is a flowchart illustrating how the authentication level of the IDaaS is lowered and how the authentication level is restored to the original level.

In step S90-1, the IDaaS corporation accepts a notice representing that a problem occurs due to an external factor.

In step ST91-1, the IDaaS corporation confirms the security state and operates the IDaaS corporation apparatus 30. In accordance with the operation performed by the IDaaS corporation, the IDaaS corporation apparatus 30 transmits an authentication level-lowering notice to the authentication providing apparatus 40.

In step ST91-2, the authentication providing apparatus 40 displays the authentication level-lowering notice, thereby prompting the authentication provider to confirm the state. The authentication provider confirms the state and determines that the authentication level should be lowered. The processing in steps ST91-1 and ST91-2 is performed in response to a predetermined operation.

In step ST91-3, the IDaaS corporation apparatus 30 lowers the authentication level stored in the authentication class management table T1 of the corresponding authentication class of the authentication providing apparatus 40. On the other hand, the IDaaS corporation apparatus 30 lowers the authentication level stored in the authentication class management table T2 of the corresponding authentication class. In this example, the authentication level is changed from "LEVEL 2" to "LEVEL 1." The IDaaS corporation apparatus 30 transmits an authentication level change notice, representing that the authentication level is changed (lowered), to the service providing apparatus 20.

According to step ST91-3, if something is wrong with the authentication processing, and the level of that authentication deteriorates, the authentication providing apparatus 30 updates the authentication class management table T2 in such a manner as to lower the authentication level of the authentication processing, and transmits to the authentication providing apparatus 40 the authentication level lowered in the authentication class management table T2 and the authentication class index associated therewith.

Upon receipt of the authentication level and authentication class index from the IDaaS corporation apparatus 30, the authentication providing apparatus 40 searches the authentication level management table T1 based on the received authentication class index, and updates the authentication level management table T1 such that the authentication level searched for is lowered to the received authentication level.

The IDaaS corporation apparatus 30 transmits an authentication level change notice to the service providing apparatus 20.

In step ST91-4, the service providing apparatus 20 accepts the authentication level change notice. The authentication level change notice is transmitted, for example, to a service providing terminal (not shown) and is displayed by the service providing terminal.

In step ST91-5, the service provider visually recognizes the authentication level change notice and takes measures, for example, in line with the policy p1 shown in FIG. 20.

After step ST91-5, the problem that caused the authentication level deterioration is solved, and the security status is restored to its original status.

In step S92-1, the IDaaS corporation accepts a notice representing that a problem due to an external factor has been solved.

In step ST92-2, the IDaaS corporation confirms the security state and operates the IDaaS corporation apparatus 30. In accordance with the operation performed by the IDaaS corporation, the IDaaS corporation apparatus 30 transmits an authentication level restoration notice to the authentication providing apparatus 40.

In step ST92-3, the authentication providing apparatus 40 displays the authentication level restoration notice, thereby prompting the authentication provider to confirm the state. The authentication provider confirms the state and determines that the authentication level should be restored. The processing in steps ST92-2 and ST92-3 is performed in response to a predetermined operation.

In step ST92-4, the IDaaS corporation apparatus 30 restores the authentication level stored in the authentication class management table T1 of the corresponding authentication class of the authentication providing apparatus 40. On the other hand, the IDaaS corporation apparatus 30 restores the authentication level stored in the authentication class management table T2 of the corresponding authentication class. In this example, the authentication level is changed from "LEVEL 1" to "LEVEL 2." The IDaaS corporation apparatus 30 transmits an authentication level restoration notice, representing that the authentication level is restored to the original level, to the service providing apparatus 20.

In step ST92-5, the service providing apparatus 20 accepts the authentication level restoration notice. The authentication level restoration notice is transmitted, for example, to a service providing terminal (not shown) and is displayed by the service providing terminal.

In step ST92-6, the service provider visually recognizes the authentication level restoration notice and takes restoration measures, for example, in line with the policy p2 shown in FIG. 21.

As described above, according to the second embodiment, if something is wrong with the authentication processing, and the level of that authentication deteriorates, the authentication providing apparatus 40 updates the authentication class management table T1 in such a manner as to lower the authentication level of the authentication processing, and transmits to the IDaaS corporation apparatus 30 the lowered authentication level and the authentication class associated therewith.

Upon receipt of the authentication level and authentication class index from the authentication providing apparatus 40, the IDaaS corporation apparatus 30 searches the authentication level management table T1 based on the received authentication class index, and updates the authentication level management table T1 such that the authentication level searched for is lowered to the received authentication level.

The second embodiment having the features described above has advantages similar to those of the first embodiment. In addition, when the authentication level is lowered, the IDaaS corporation apparatus 30 of the second embodiment does not have to update the SSO account information of each user ID. Since the IDaas corporation apparatus 30 is only required to update the authentication level management table T2, the load required for lowering the authentication level can be significantly reduced.

According to the first embodiment and/or the second embodiment, the service providing apparatus 20, the IDaaS corporation apparatus 30 and the authentication providing apparatus 40 cooperate with one another, using federation IDs included in the account information ac1-ac3. This feature enables the authentication method to be easily changed, with the convenience of the user and the service provider being enhanced.

The method described in each embodiment can also be stored in a storage medium such as a magnetic disk (Floppy™ disk, hard disk, or the like), an optical disk (CD-ROM, DVD, or the like), a magneto-optical disk (MO), or a semiconductor memory as a program which can be executed by a computer and distributed.

As the storage medium, any configuration which is a computer-readable storage medium in which a program can be stored may be used regardless of a storage format.

An OS (operating system) which operates on a computer on the basis of an instruction of a program installed from the storage medium in the computer, database management software, and MW (middleware) such as network software may execute a part of the processes to realize the embodiment.

Furthermore, the storage medium according to the embodiment includes not only a medium independent of a computer but also a storage medium in which a program transmitted through a LAN, the Internet, or the like is downloaded and stored or temporarily stored.

The number of storage media is not limited to one. A case in which the process in each embodiment is executed from a plurality of media is included in the storage medium according to the present invention. Any medium configuration may be used.

A computer according to each embodiment is to execute the processes in each of the embodiments on the basis of the program stored in a storage medium. The computer may have any configuration such as one apparatus constituted by a personal computer or a system in which a plurality of apparatuses are connected by a network.

A computer in each embodiment includes not only a personal computer but also an arithmetic processing apparatus, a microcomputer, or the like included in an information processing apparatus. The computer is a generic name of an apparatus and a device which can realize the functions of the present invention by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit, of the inventions. The accompanying claims and their equivalents are intended to cover such forms or modifications as would fall within the scope and spirit of the inventions.

The invention claimed is:

1. An authentication system comprising:
a service providing apparatus capable of communicating with a user terminal operated by a user; an Identity as a Service (IDaaS) corporation apparatus, and an authentication providing apparatus,
the service providing apparatus comprising a service account information memory that stores service account information including: (i) service account identifiers for identifying accounts of a service provided by the service providing apparatus; and (ii) a first federation ID,
the IDaaS corporation apparatus comprising a single sign-on (SSO) account information memory that stores single sign-on (SSO) account information including (i) a single sign-on (SSO) account identifier which is identical to a user ID for identifying the user, (ii) a first federation ID, and (iii) a second federation ID different from the first federation ID,
the authentication providing apparatus comprising an authentication account information memory that stores authentication account information including: (i) an authentication account identifier for identifying an account of authentication processing corresponding to the user, (ii) a second federation ID which is identical to the second federation ID, and (iii) an authentication class indicative of a method of the authentication processing,
wherein, based on the user ID and an SSO request transmitted from the user terminal, the authentication providing apparatus having authentication account information which is associated, by the second federation ID, with the SSO account information including the SSO account identifier identical to the user ID, executes authentication processing for the user who operates the user terminal,
if a result of the authentication processing indicates success, the IDaaS corporation apparatus having SSO account information including the SSO account identifier identical to the user ID of the user subjected to authentication processing, permits SSO authentication to be executed for the service identified by the service account identifier included in the service account information associated with the SSO account information by the first federation ID, and
the service providing apparatus which provides the service for which the SSO authentication is permitted, transmits information related to the service to the user terminal which transmitted the user ID and the SSO request, and
wherein the authentication providing apparatus comprises a first table memory storing an authentication class management table in which an authentication class representing an authentication method and an authentication level representing the level of the authentication processing are described in association with each other,
the SSO account information memory includes the authentication level,
if something is wrong with the authentication processing, and the level of that authentication deteriorates, the authentication providing apparatus updates the authentication class management table in such a manner as to lower the authentication level of the authentication processing, and transmits to the IDaaS corporation apparatus the lowered authentication level and the authentication class associated therewith in the authentication account information, and
upon receipt of the authentication level and authentication class from the authentication providing apparatus, the IDaaS corporation apparatus searches the SSO account information based on the received authentication class, and updates the SSO account information such that the authentication level searched for is lowered to the received authentication level.

2. An authentication system comprising:
a service providing apparatus capable of communicating with a user terminal operated by a user; an Identity as a Service (IDaaS) corporation apparatus, and an authentication providing apparatus,
the service providing apparatus comprising a service account information memory that stores service account information including: (i) service account identifiers for identifying accounts of a service provided by the service providing apparatus; and (ii) a first federation ID,
the IDaaS corporation apparatus comprising a single sign-on (SSO) account information memory that stores single sign-on (SSO) account information including (i) a single sign-on (SSO) account identifier which is identical to a user ID for identifying the user, (ii) a first federation ID, and (iii) a second federation ID different from the first federation ID,
the authentication providing apparatus comprising an authentication account information memory that stores authentication account information including: (i) an authentication account identifier for identifying an account of authentication processing corresponding to the user, (ii) a second federation ID which is identical to the second federation ID, and (iii) an authentication class indicative of a method of the authentication processing.

wherein, based on the user ID and an SSO request transmitted from the user terminal, the authentication providing apparatus having authentication account information which is associated, by the second federation ID, with the SSO account information including the SSO account identifier identical to the user ID, executes authentication processing for the user who operates the user terminal, if a result of the authentication processing indicates success, the IDaaS corporation apparatus having SSO account information including the SSO account identifier identical to the user ID of the user subjected to authentication processing, permits SSO authentication to be executed for the service identified by the service account identifier included in the service account information associated with the SSO account information by the first federation ID, and the service providing apparatus which provides the service for which the SSO authentication is permitted, transmits information related to the service to the user terminal which transmitted the user ID and the SSO request, and wherein the authentication providing apparatus comprises a first table memory storing an authentication class management table in which an authentication class representing an authentication method, an authentication level representing the level of the authentication processing and an authentication class index including a name of an authentication provider of the authentication class are described in association with one another, the SSO account information memory does not include the authentication level but includes the authentication class index, the IDaaS corporation apparatus comprises a second table memory storing an authentication level management table in which an authentication level and an authentication class index are described in association with each other, if something is wrong with the authentication processing, and the level of that authentication deteriorates, the authentication providing apparatus updates the authentication class management table in such a manner as to lower the authentication level of the authentication processing, and transmits to the IDaaS corporation apparatus the authentication level lowered in the authentication class management table and the authentication class index associated therewith, and upon receipt of the authentication level and authentication class index from the authentication providing apparatus, the IDaaS corporation apparatus searches the authentication level management table based on the received authentication class index, and updates the authentication level management table such that the authentication level searched for is lowered to the received authentication level.

3. An authentication system comprising an IDaaS corporation apparatus and an authentication providing apparatus capable of respectively communicating with a user terminal operated by a user and a service providing apparatus for providing the user with a service, the service providing apparatus comprising a service account information memory that stores service account information including (i) a service account identifier for identifying an account of the service provided by the service providing apparatus and (ii) a first federation ID, the IDaaS corporation apparatus comprising a single sign-on (SSO) account information memory that stores single sign-on (SSO) account information including (i) a single sign-on account identifier which is identical to a user ID for identifying the user, (ii) a first federation ID, and (iii) a second federation ID different from the first federation ID, the authentication providing apparatus comprising an authentication account information memory that stores authentication account information including (i) an authentication account identifier for identifying an account of authentication processing corresponding to the user, (ii) a second federation ID which is identical to the second federation ID, and (iii) an authentication class indicative of a method of the authentication processing, wherein, based on the user ID and an SSO request transmitted from the user terminal, the authentication providing apparatus having authentication account information which is associated, by the second federation ID, with the SSO account information including the SSO account identifier identical to the user ID, executes authentication processing for the user who operates the user terminal, if a result of the authentication processing indicates success, the IDaaS corporation apparatus having SSO account information including the SSO account identifier identical to the user ID of the user subjected to authentication processing, permits SSO authentication to be executed for the service identified by the service account identifier included in the service account information associated with the SSO account information by the first federation ID, and the service providing apparatus which provides the service for which the SSO authentication is permitted, transmits information related to the service to the user terminal which transmitted the user ID and the SSO request, and wherein the authentication providing apparatus comprises a first table memory storing an authentication class management table in which an authentication class representing an authentication method and an authentication level representing the level of the authentication processing are described in association with each other, the SSO account information memory includes the authentication level, if something is wrong with the authentication processing, and the level of that authentication deteriorates, the authentication providing apparatus updates the authentication class management table in such a manner as to lower the authentication level of the authentication processing, and transmits to the IDaaS corporation apparatus the lowered authentication level and the authentication class associated therewith in the authentication account information, and upon receipt of the authentication level and authentication class from the authentication providing apparatus, the IDaaS corporation apparatus searches the SSO account information based on the received authentication class, and updates the SSO account information such that the authentication level searched for is lowered to the received authentication level.

4. An authentication method executed by an authentication system comprising:

a service providing apparatus comprising a service account information memory that stores service account information including (i) a service account identifier for identifying an account of a service provided to a user who operates a user terminal and (ii) a first federation ID, an IDaaS corporation apparatus comprising a single sign-on (SSO) account information memory that stores single sign-on (SSO) account information including (i) a single sign-on account identifier which is identical to a user ID for identifying the user, (ii) a first federation ID identical to the first federation ID, and (iii) a second federation ID different from the first federation ID, and an authentication providing apparatus comprising an authentication account information memory that stores authentication account information including (i) an authentication account identifier for identifying an account of authentication processing corresponding to the user, (ii) a second federation ID which is identical to the second federation ID described above, and (iii) an authentication class indicative of a method of the authentication processing, and a first table memory storing an authentication class management table in which an authentication class representing an authentication method, an authentication level representing the level of the authentication processing and an authentication class index including a name of an authentication provider of the authentication class are described in association with one another, wherein the SSO account information memory includes the authentication level, said authentication method comprising:

causing the IDaaS corporation apparatus to transmit, based on a user terminal an SSO requested transmitted from the user terminal, an authentication request to an authentication providing apparatus having authentication account information which is associated, by the second federation ID, with the SSO account information including the SSO account identifier identical to the user ID, causing the authentication providing apparatus to perform authentication processing for a user who operates the user terminal, based on the authentication request received from the IDaaS corporation apparatus, and to transmit a result of the authentication processing to the IDaaS corporation apparatus, if the result of the authentication processing indicates success, causing the IDaaS corporation apparatus to permit SSO authentication to be executed for the service identified by the service account identifier included in the service account information associated, by the first federation ID, with the SSO account information including the SSO account identifier identical to the user ID subjected to the authentication processing, and to transmit permission to the service providing apparatus, and causing the service providing apparatus to transmit information related to a service for which the SSO authentication is permitted, to the user terminal which transmitted the user ID and the SSO request, if something is wrong with the authentication processing, and the level of that authentication deteriorates, causing the authentication providing apparatus to update the authentication class management table in such a manner as to lower the authentication level of the authentication processing, and transmit to the IDaaS corporation, apparatus the lowered authentication level and the authentication class associated therewith in the authentication account information, and upon receipt of the authentication level and authentication class from the authentication providing apparatus, causing the IDaaS corporation apparatus to search the SSO account information based on the received authentication class, and update the SSO account information such that the authentication level searched for is lowered to the received authentication level.

5. A non-transitory computer-readable storage medium storing a program which is used for an IDaaS corporation apparatus of an authentication system comprising:

a service providing apparatus storing service account information including (i) a service account identifier for identifying an account of a service provided to a user who operates a user terminal and (ii) a first federation ID, an IDaaS corporation apparatus comprising an SSO account information memory that stores single sign-on (SSO) account information including (i) a single sign-on (SSO) account identifier which is identical to a user ID for identifying the user, (ii) a first federation ID identical to the first federation ID, and (iii) a second federation ID different from the first federation ID, and an authentication providing apparatus storing authentication account information including (i) an authentication account identifier for identifying an account of authentication processing corresponding to the user, (ii) a second federation ID which is identical to the second federation ID, and (iii) an authentication class indicative of a method of the authentication processing, and a first table memory storing an authentication class management table in which an authentication class representing an authentication method, an authentication level representing the level of the authentication processing and an authentication class index including a name of an authentication provider of the authentication class are described in association with one another, wherein the SSO account information memory includes the authentication level, the program comprising:

first program code for causing the IDaaS corporation apparatus to transmit, based on a user terminal an SSO requested transmitted from the user terminal, an authentication request to an authentication providing apparatus having authentication account information which is associated, by the second federation ID, with the SSO account information including the SSO account identifier identical to the user ID, second program code, executed if the authentication providing apparatus executes authentication processing for the user based on the authentication request and the result of the authentication processing indicates success, for permitting SSO authentication to be performed for service identified by the service account identifier included in the service account Information associated, by the first federation ID, with the SSO account information including an SSO account identifier identical to the user ID of the user subjected to the authentication processing, and for causing the IDaaS corporation apparatus to transmit a permission to the service providing apparatus, wherein the service providing apparatus transmits information related to a service for which the SSO authentication is permitted, to the user terminal which transmitted the user ID and the SSO request, third program code, if something is wrong with the authentication processing, and the level of that authentication deteriorates, for causing the authentication providing apparatus to update the authentication class management table in such a manner as to lower the authentication level of the authentication processing, and transmit to the IDaaS corporation apparatus the lowered authentication level and the authentication class associated therewith in the authentication account information, and fourth program code, upon receipt of the authentication level and authentication class from the authentication providing apparatus, for causing the IDaaS corporation apparatus to search the SSO account information based on the received authentication class, and update the SSO account information such that the authentication level searched for is lowered to the received authentication level.

6. An authentication system comprising an IDaaS corporation apparatus and an authentication providing apparatus capable of respectively communicating with a user terminal operated by a user and a service providing apparatus for providing the user with a service, the service providing apparatus comprising a service account information memory that stores service account information including (i) a service account identifier for identifying an account of the service provided by the service providing apparatus and (ii) a first federation ID, the IDaaS corporation apparatus comprising a single sign-on (SSO) account information memory that stores single sign-on (SSO) account information including (i) a single sign-on account identifier which is identical to a user ID for identifying the user, (ii) a first federation ID, and (iii) a second federation ID different from the first federation ID, the authentication providing apparatus comprising an authentication account information memory that stores authentication account information including (i) an authentication account identifier for identifying an account of authentication processing corresponding to the user, (ii) a second federation ID which is identical to the second federation ID, and (iii) an authentication class indicative of a method of the authentication processing, wherein, based on the user ID and an SSO request transmitted from the user terminal, the authentication providing apparatus having authentication account information which is associated, by the second federation ID, with the SSO account information including the SSO account identifier identical to the user ID, executes authentication processing for the user who operates the user terminal, if a result of the authentication processing indicates success, the IDaaS corporation apparatus having SSO account information including the SSO account identifier identical to the user ID of the user subjected to authentication processing, permits SSO authentication to be executed for the service identified by the service account identifier included in the service account information associated with the SSO account information by the first federation ID, and the service providing apparatus which provides the service for which the SSO authentication is permitted, transmits information related to the service to the user terminal which transmitted the user ID and the SSO request, wherein the authentication providing apparatus comprises a first table memory storing an authentication class management table in which an authentication class representing an authentication method, an authentication level representing the level of the authentication processing and an authentication class index including a name of an authentication provider of the authentication class are described in association with one another, the SSO account information memory does not Include the authentication level but includes the authentication class index, the IDaaS corporation apparatus comprises a second table memory storing an authentication level management table in which an authentication level and an authentication class index are described in association with each other, if something is wrong with the authentication processing, and the level of that authentication deteriorates, the authentication providing apparatus updates the authentication class management table in such a manner as to lower the authentication level of the authentication processing, and transmits to the IDaaS corporation apparatus the authentication level lowered in the authentication class management table and the authentication class index associated therewith, and upon receipt of the authentication level and authentication class index from the authentication providing apparatus, the IDaaS corporation apparatus searches the authentication level management table based on the received authentication class index, and updates the authentication level management table such that the authentication level searched for is lowered to the received authentication level.

7. An authentication method executed by an authentication system comprising:

a service providing apparatus comprising a service account information memory that stores service account information including (i) a service account identifier for identifying an account of a service provided to a user who operates a user terminal and (ii) a first federation ID, an IDaaS corporation apparatus comprising a single sign-on (SSO) account information memory that stores single sign-on (SSO) account information including (i) a single sign-on account identifier which is identical to a user ID for identifying the user, (II) a first federation ID identical to the first federation ID, and (iii) a second federation ID different from the first federation ID, and an authentication providing apparatus comprising an authentication account information memory that stores authentication account information including (i) an authentication account identifier for identifying an account of authentication processing corresponding to the user, (ii) a second federation ID which is identical to the second federation ID described above, and (iii) an authentication class indicative of a method of the authentication processing, and a first table memory storing an authentication class management table in which an authentication class representing an authentication method, an authentication level representing the level of the authentication processing and an authentication class index including a name of an authentication provider of the authentication class are described in association with one another, wherein the SSO account information memory does not include the authentication level but includes the authentication class index, and the IDaaS corporation apparatus comprises a second table memory storing an authentication level management table in which an authentication level and an authentication class index are described in association with each other, said authentication method comprising:

causing the IDaaS corporation apparatus to transmit, based on a user terminal an SSO requested transmitted from the user terminal, an authentication request to an authentication providing apparatus having authentication account information which is associated, by the second federation ID, with the SSO account information including the SSO account identifier identical to the user ID, causing the authentication providing apparatus to perform authentication processing for a user who operates the user terminal, based on the authentication request received from the IDaaS corporation apparatus, and to transmit a result of the authentication processing to the IDaaS corporation apparatus, if the result of the authentication processing indicates success, causing the IDaaS corporation apparatus to permit SSO authentication to be executed for the service identified by the service account identifier included in the service account information associated, by the first federation ID, with the SSO account information including the SSO account identifier identical to the user ID subjected to the authentication processing, and to transmit permission to the service providing apparatus, causing the service providing apparatus to transmit information related to a service for which the SSO authentication is permitted, to the user terminal which transmitted the user ID and the SSO request, if something is wrong with the authentication processing, and the level of that authentication deteriorates, causing the authentication providing apparatus to update the authentication class management table in such a manner as to lower the authentication level of the authentication processing, and transmit to the IDaaS corporation apparatus the authentication level lowered in the authentication class management table and the authentication class index associated therewith, and upon receipt of the authentication level and authentication class index from the authentication providing apparatus, causing the IDaaS corporation apparatus to search the authentication level management table based on the received authentication class index, and update the authentication level management table such that the authentication level searched for is lowered to the received authentication level.

8. A non-transitory computer-readable storage medium storing a program which is used for an IDaaS corporation apparatus of an authentication system comprising:

a service providing apparatus storing service account information including (i) a service account identifier for identifying an account of a service provided to a user who operates a user terminal and (ii) a first federation ID, an IDaaS corporation apparatus comprising an SSO account information memory that stores single sign-on (SSO) account information including (i) a single sign-on (SSO) account identifier which is identical to a user ID for identifying the user, (ii) a first federation ID identical to the first federation ID, and (iii) a second federation ID different from the first federation ID, and an authentication providing apparatus storing authentication account information including (i) an authentication account identifier for identifying an account of authentication processing corresponding to the user, (ii) a second federation ID which is identical to the second federation ID, and (iii) an authentication class indicative of a method of the authentication processing, and a first table memory storing an authentication class management table in which an authentication class representing an authentication method, an authentication level representing the level of the authentication processing and an authentication class index including a name of an authentication provider of the authentication class are described in association with one another, wherein the SSO account information memory does not include the authentication level but includes the authentication class index, and the IDaaS corporation apparatus comprises a second table memory storing an authentication level management table in which an authentication level and an authentication class index are described in association with each other, the program comprising:

first program code for causing the IDaaS corporation apparatus to transmit, based on a user terminal an SSO requested transmitted from the user terminal, an authentication request to an authentication providing apparatus having authentication account information which is associated, by the second federation ID, with the SSO account information including the SSO account identifier identical to the user ID, second program code, executed if the authentication providing apparatus executes authentication processing for the user based on the authentication request and the result of the authentication processing indicates success, for permitting SSO authentication to be performed for service identified by the service account identifier included in the service account information associated, by the first federation ID, with the SSO account information including an SSO account identifier identical to the user ID of the user subjected to the authentication processing, and for causing the IDaaS corporation apparatus to transmit a permission to the service providing apparatus, wherein the service providing apparatus transmits information related to a service for which the SSO authentication is permitted, to the user terminal which transmitted the user ID and the SSO request, third program code, if something is wrong with the authentication processing, and the level of that authentication deteriorates, for causing the authentication providing apparatus to update the authentication class management table in such a manner as to lower the authentication level of the authentication processing, and transmit to the IDaaS corporation apparatus the authentication level lowered in the authentication class management table and the authentication class index associated therewith, and fourth program code, upon receipt of the authentication level and authentication class index from the authentication providing apparatus, for causing the IDaaS corporation apparatus to search the authentication level management table based on the received authentication class index, and update the authentication level management table such that the authentication level searched for is lowered to the received authentication level.

* * * * *